(12) United States Patent
Mahmoudi et al.

(10) Patent No.: US 10,811,968 B2
(45) Date of Patent: Oct. 20, 2020

(54) POWER MANAGEMENT SYSTEM INCLUDING A DIRECT-CURRENT TO DIRECT-CURRENT CONVERTER HAVING A PLURALITY OF SWITCHES

(71) Applicant: Atlazo, Inc., La Jolla, CA (US)

(72) Inventors: Farsheed Mahmoudi, La Jolla, CA (US); Hajir Hedayati, La Jolla, CA (US); Masoud Ensafdaran, La Jolla, CA (US); Bardia Pishdad, La Jolla, CA (US); Monib Ahmed, La Jolla, CA (US); Tamer Kafafi, La Jolla, CA (US); Salem Emara, La Jolla, CA (US)

(73) Assignee: ATLAZO, INC., La Jolla, CA (US)

( * ) Notice: Subject to any disclaimer, the term of this patent is extended or adjusted under 35 U.S.C. 154(b) by 0 days.

(21) Appl. No.: 16/240,557

(22) Filed: Jan. 4, 2019

(65) Prior Publication Data
US 2019/0214906 A1 Jul. 11, 2019

Related U.S. Application Data

(60) Provisional application No. 62/614,289, filed on Jan. 5, 2018.

(51) Int. Cl.
*H02M 3/158* (2006.01)
*G06F 1/26* (2006.01)
*H02M 3/18* (2006.01)

(52) U.S. Cl.
CPC ............ *H02M 3/158* (2013.01); *G06F 1/26* (2013.01); *H02M 3/1582* (2013.01); *H02M 3/18* (2013.01)

(58) Field of Classification Search
CPC .. H02M 2001/0048; H02M 1/14; H02M 1/42; H02M 3/158; H02M 3/1584; H02M 3/1582; H02M 3/155; G06F 1/26
See application file for complete search history.

(56) References Cited

U.S. PATENT DOCUMENTS

| | | | |
|---|---|---|---|
| 5,481,178 A | 1/1996 | Wilcox | |
| 6,636,022 B2 | 10/2003 | Sluijs | |

(Continued)

OTHER PUBLICATIONS

Qian, J. et al. (Dec. 2009). Single-inductor Dual-output DC/DC Buck converter With High full-load Efficiency. 10.1109/EDSSC.2009.5394235. (3 pages).

(Continued)

*Primary Examiner* — Gustavo A Rosario-Benitez
(74) *Attorney, Agent, or Firm* — Perkins Coie LLP

(57) ABSTRACT

The disclosed technology can be used to convert direct-current voltage and current from an input to a different or the same voltage and current at an output. One example direct-current to direct-current (DC-DC) power converter includes a first switch connected between a source voltage and a first side of an inductor, a second switch connected between the first side of the inductor and a ground, a third switch connected between a second side of the inductor and the ground, and a fourth switch connected between the second side of the inductor and a capacitor. The power converter may further include a comparator configured to compare an output voltage at the capacitor to a threshold voltage and based on the result of the comparison selectively activate or deactivate the first, second, third, and fourth switches in a power cycle.

19 Claims, 16 Drawing Sheets

(56) References Cited

U.S. PATENT DOCUMENTS

| | | | |
|---|---|---|---|
| 7,174,523 B2 | 2/2007 | Engel et al. | |
| 7,298,119 B1* | 11/2007 | Amram Summit | H02M 3/1582 323/225 |
| 7,487,474 B2 | 2/2009 | Ciplickas | |
| 7,552,409 B2 | 6/2009 | Kucukcakar | |
| 7,913,071 B2 | 3/2011 | Mallik et al. | |
| 8,018,212 B1* | 9/2011 | Petricek | H02M 3/1582 323/259 |
| 8,049,568 B2 | 11/2011 | Youssef et al. | |
| 8,051,398 B2 | 11/2011 | Bittlestone | |
| 8,129,961 B2* | 3/2012 | Buethker | H02M 3/1582 323/224 |
| 8,169,203 B1 | 5/2012 | Vemula | |
| 8,307,317 B2 | 11/2012 | Adams | |
| 8,464,199 B1 | 6/2013 | Charlebois et al. | |
| 8,543,966 B2 | 9/2013 | Bickford | |
| 8,692,584 B2 | 4/2014 | Nakamura et al. | |
| 9,281,780 B2 | 3/2016 | Yayama et al. | |
| 9,317,048 B2 | 4/2016 | Kuang | |
| 9,408,266 B2 | 8/2016 | Logiudice | |
| 9,503,106 B1 | 11/2016 | Ding et al. | |
| 9,698,674 B1* | 7/2017 | Cherkassky | H02M 3/1582 |
| 9,829,911 B2 | 11/2017 | Yayama et al. | |
| 9,915,963 B1 | 3/2018 | Wu | |
| 10,222,852 B2 | 3/2019 | Foreman | |
| 10,236,763 B2 | 3/2019 | Hu | |
| 10,416,746 B2 | 9/2019 | Solki et al. | |
| 2003/0001547 A1* | 1/2003 | Jurzitza | H02M 3/1582 323/225 |
| 2004/0090802 A1* | 5/2004 | Pourseyed | H02M 3/156 363/39 |
| 2005/0184711 A1 | 8/2005 | Chen et al. | |
| 2006/0114017 A1 | 6/2006 | El-kik | |
| 2007/0018712 A1 | 1/2007 | Gk | |
| 2007/0089078 A1 | 4/2007 | Engel | |
| 2008/0103495 A1* | 5/2008 | Mihori | A61B 18/1206 606/38 |
| 2008/0122291 A1 | 5/2008 | Uchimoto | |
| 2009/0037854 A1 | 2/2009 | Bittlestone | |
| 2009/0284240 A1 | 11/2009 | Zhang | |
| 2010/0052635 A1 | 3/2010 | Wang | |
| 2010/0194434 A1 | 8/2010 | Tran Vo | |
| 2010/0327952 A1 | 12/2010 | Wu | |
| 2011/0248764 A1 | 10/2011 | Das | |
| 2011/0267017 A1 | 11/2011 | Zhang et al. | |
| 2012/0124538 A1 | 5/2012 | Lackey | |
| 2012/0159216 A1 | 6/2012 | Wells | |
| 2013/0069608 A1 | 3/2013 | Gakhar et al. | |
| 2013/0099764 A1 | 4/2013 | Zhang et al. | |
| 2013/0141068 A1* | 6/2013 | Kay | H03F 1/0227 323/282 |
| 2013/0271100 A1 | 10/2013 | El-Nozahi | |
| 2014/0152344 A1 | 6/2014 | Chiou | |
| 2014/0225579 A1 | 8/2014 | Dally | |
| 2014/0232360 A1 | 8/2014 | Dally | |
| 2015/0198960 A1 | 7/2015 | Zhang et al. | |
| 2015/0214841 A1 | 7/2015 | Ramorini et al. | |
| 2016/0077537 A1 | 3/2016 | Enjalbert et al. | |
| 2016/0094125 A1* | 3/2016 | Milanesi | H02M 3/1584 323/271 |
| 2016/0118894 A1 | 4/2016 | Zhang | |
| 2016/0164497 A1 | 6/2016 | Agarwal | |
| 2016/0334818 A1 | 11/2016 | Singh | |
| 2016/0359421 A1 | 12/2016 | Lin | |
| 2017/0033698 A1 | 2/2017 | Vemuri | |
| 2017/0093350 A1 | 3/2017 | Ramos et al. | |
| 2017/0115678 A1 | 4/2017 | Qing et al. | |
| 2017/0160757 A1 | 6/2017 | Yang | |
| 2017/0272073 A1 | 9/2017 | Betz | |
| 2018/0120879 A1 | 5/2018 | Du et al. | |
| 2018/0173258 A1 | 6/2018 | Singh | |
| 2018/0284829 A1 | 10/2018 | Hussien et al. | |
| 2018/0321092 A1 | 11/2018 | Jones | |
| 2019/0131876 A1* | 5/2019 | Luff | H02M 3/1582 |
| 2019/0212799 A1 | 7/2019 | Solki et al. | |
| 2019/0213292 A1 | 7/2019 | Solki et al. | |
| 2019/0235566 A1 | 8/2019 | Ensafdaran | |
| 2019/0258283 A1 | 8/2019 | Pishdad et al. | |
| 2019/0280593 A1 | 9/2019 | Hedayati et al. | |

OTHER PUBLICATIONS

Tao, C. et al. (Nov. 2011). A Buck Converter With Reduced Output Spurs Using Asynchronous Frequency Hopping. IEEE Transactions on Circuits and Systems—II: Express Briefs, vol. 58, No. 11, p. 709-713. (5 pages).

Ko, Y. et al. (Jun. 2014) Load-Balance-Independent High Efficiency Single-Inductor Multiple-Output (SIMO) DC-DC Converters. Journal of Semiconductor Technology and Science, vol. 14, No. 3., p. 300-312. (13 pages).

Harris, David M. Det al., "A transregional model for near-threshold circuits with application to minimum-energy operation," in Proc. 2010 Int. Conf. Microelectronics (ICM), Cairo, Egypt, Dec. 19-22, 2010, pp. 64-67.

S. Kosonocky et al., "Designing in Scaled Technologies: 32nm and Beyond," presented at 2012 Symposia on VLSI Technology and Circuits, Honolulu, HI, Jun. 2012.

Jungseob Lee et al., "Improving Throughput of Power-Constrained GPUs Using Dynamic Voltage/Frequency and Core Scaling," in Proc. 2011 Int. Conf. Parallel Architectures and Compilation Techniques (PACT), Galveston, TX, Oct. 10-14, 2011, pp. 111-120.

Massimo Alioto, "Ultra-Low Power VLSI Circuit Design Demystified and Explained: A Tutorial," IEEE Trans. Circuits Syst. I, Reg. Papers, vol. 59, pp. 3-29, Jan. 2012.

Alice Wang, et al., "Optimal supply and threshold scaling for subthreshold CMOS circuits," in Proc. 2002 IEEE Computer Society Annu. Symp. VLSI, Pittsburg, PA, Apr. 25-26, 2002, pp. 5-9.

Bo Zhai et al., "Energy-Efficient Subthreshold Processor Design," IEEE Trans. Very Large Scale Integr. (VLSI) Syst., vol. 17, pp. 1127-1137, Aug. 2009.

Y. Pu et al., "Misleading energy and performance claims in sub/near threshold digital systems," in Proc. 2010 IEEE/ACM Int. Conf. Computer-Aided Design (ICCAD), San Jose, CA, Nov. 7-11, 2010, pp. 625-631.

D. Bol et al., "Interests and Limitations of Technology Scaling for Subthreshold Logic," IEEE Trans. Very Large Scale Integr. (VLSI) Syst., vol. 17, pp. 1508-1519, Oct. 2009.

S. Jain et al., "A 280mV-to-1.2V wide-operating-range IA-32 processor in 32nm CMOS," in Digest of Technical Papers 2012 IEEE Int. Solid-State Circuits Conf. (ISSCC), San Francisco, CA, Feb. 19-23, 2012, pp. 66-68.

D. Wolpert and P. Ampadu, "Exploiting Programmable Temperature Compensation Devices to Manage Temperature-Induced Delay Uncertainty," IEEE Trans. Circuits and Syst. I: Reg. Papers, vol. 59, pp. 735-748, Apr. 2012.

BSSIM4.3.0 MOSFET Model—User's Manual, Department of Electrical Engineering and Computer Sciences, University of California, Berkeley, CA, 2003.

M. Faisal, N. E. Roberts and D. D. Wentzloff, "A 300nW near-threshold 187.5-500 kHz programmable clock generator for ultra low power SoCs," 2015 IEEE SOI-3D-Subthreshold Microelectronics Technology Unified Conference (S3S), Rohnert Park, CA, 2015, pp. 1-3.

M. Huang and C. Hung, "Full-custom all-digital phase locked loop for clock generation," VLSI Design, Automation and Test(VLSI-DAT), Hsinchu, 2015, pp. 1-4.

J. Liu et al., "A 0.8V, sub-mW, varactor-tuning ring-oscillator-based clock generator in 32nm CMOS," IEEE Asian Solid-State Circuits Conference 2011, Jeju, 2011, pp. 337-340.

A. Tajalli and Y. Leblebici, "A 9 pW/Hz adjustable clock generator with 3-decade tuning range for dynamic power management in subthreshold SCL systems," 2010 Proceedings of ESSCIRC, Seville, 2010, pp. 242-245.

X. Zhang and A B. Apsel, "A Low-Power, Process-and-Temperature-Compensated Ring Oscillator With Addition-Based Current Source,"

(56) References Cited

OTHER PUBLICATIONS in IEEE Transactions on Circuits and Systems I: Regular Papers, vol. 58, No. 5, pp. 868-878, May 2011.
Man et al, "A High Slew-Rate Push—Pull Output Amplifier for Low-Quiescent Current Low-Dropout Regulators With Transient-Response Improvement", IEEE Transactions on Circuits and Systems II: Express Briefs, 2007.
Y. Lu, et al., "A 0.65ns-Response-Time 3.01ps FOM Fully-Integrated Low-Dropout Regulator with Full-Spectrum Power-Supply-Rejection for Wideband Communication Systems", IEEE ISSCC, pp. 306-307, Feb. 2014.
Chen, Y. et. al, "An Ultra-low Quiescent Current Output Capacitor-less Low-Dropout Regulator with a Novel Slew-rate-enhanced Circuit", 2014 IEEE International Symposium on Radio-Frequency Integration Technology.
X. Ming, et al, "A Low-Power Ultra-Fast Capacitor-Less LDO With Advanced Dynamic Push-Pull Techniques", International Conference on VLSI and System-on-Chip, pp. 54-59, 2011.
Liu et al, "An Ultra-Low Power Voltage Regulator for RFID Application", Chia-Chin, Chunhong Chen, 2013 IEEE 56th International Midwest Symposium on Circuits and Systems (MWSCAS).
Liu et al, "A 90nA quiescent current 1.5V-5V 50mA asynchronous folding LDO using dual loop control", 2016 IEEE Asian Solid-State Circuits Conference (A-SSCC).
Mazumdar et al, "A Digitally-Controlled Power-Aware Low-Dropout Regulator to Reduce Standby Current Drain in Utra-Low-Power MCU", 2015 International Symposium on Quality Electronic Design.
Liang et al, "A 802 nA Quiescent Current and 100 mA Load Low-Dropout Regulator for Micro Energy Harvest System", 2018 2018 13th IEEE Conference on Industrial Electronics and Applications (ICIEA).
Rikan et. al, "A low leakage retention LDO and leakage-based BGR with 120nA quiescent current", 2017 International SoC Design Conference (ISOCC).
Chien-Yi Wu et al, "An ultra-low power capacitor-less LDO for always-on domain in NB-loT applications", 2018 IEEE International Conference on Applied System Invention (ICASI).
International Application No. PCT/US2019/012414 International Search Report and Written Opinion dated May 8, 2019.
Solki, Shahin et al. U.S. Appl. No. 16/242,405 Non-Final Office Action dated Mar. 29, 2019.
Solki, Shahin et al. U.S. Appl. No. 16/244,509 Non-Final Office Action dated Mar. 28, 2019.
Solki, Shahin et al. U.S. Appl. No. 16/244,509 Notice of Allowance dated Jul. 17, 2019.
Hedayati, Hajir et al. U.S. Appl. No. 16/295,876 Non-Final Office Action dated Sep. 12, 2019.
Pishdad, Bardia et al. U.S. Appl. No. 16/281,021 Non-Final Office Action dated Jul. 10, 2019.
Ensafdaran, Masoud et al. U.S. Appl. No. 16/265,648 Non-Final Office Action dated Aug. 9, 2019.
Solki, Shahin et al. U.S. Appl. No. 16/242,405 Non-final Office Action dated Sep. 25, 2019.

* cited by examiner

POWER MANAGEMENT SYSTEM INCLUDING A DIRECT-CURRENT TO DIRECT-CURRENT CONVERTER HAVING A PLURALITY OF SWITCHES

RELATED APPLICATIONS

This application claims priority to the provisional application with Ser. No. 62/614,289, titled "Integrated Power Management System," filed Jan. 5, 2018. The entire contents of the above noted provisional application are incorporated by reference as part of the disclosure of this document.

TECHNICAL FIELD

The present disclosure relates to circuits for supplying power to other circuits, and more specifically, to power circuits that perform highly efficient power conversion.

BACKGROUND

Many circuits proposed in the Internet of Things (IoT) literature addresses some of the IoT requirements including, wireless connectivity, data processors, storage, power management, and input/output (I/O) capability. However, the necessary small form factor, ultra-low power consumption, and low cost are less addressed. Low power consumption and high efficiency power management is critical in IoT applications since they directly impact the battery lifetime of the system. Many other devices other than IoT devices also require efficient and low power consumption power supplies. More efficient, low cost power supply circuits are needed for IoT and many other applications.

DETAILED DESCRIPTION

Some important characteristics of battery powered electronic devices are the battery life per battery charge and the cost of the device. Many battery-powered electronic devices have a battery producing one voltage that is different from one or more voltages required by the electronics in the battery powered device. The voltage(s) required by the device are produced by one or more DC-DC converters. The power efficiency of these converters has a direct impact on the battery life. The disclosed DC-DC converters have higher efficiencies than previous converters especially at light load conditions. Moreover, the disclosed converters reduce the cost of the battery powered devices because of having fewer and less expensive components (a reduced bill of materials (BoM). Disclosed herein are DC-DC converters that can produce multiple output voltages using a single inductor and associated electronics, thereby reducing the BoM and cost. The disclosed DC-DC converters provide multiple outputs using a single inductor without any cross-regulation between the outputs.

Some solutions are proposed in the literature that attempt to address the stringent power and bill of material (BoM) requirements of IoT and other applications based on conventional power management circuits. However, due to fundamental limitations, BoM reduction and power reduction improvement is limited.

Figure 8:
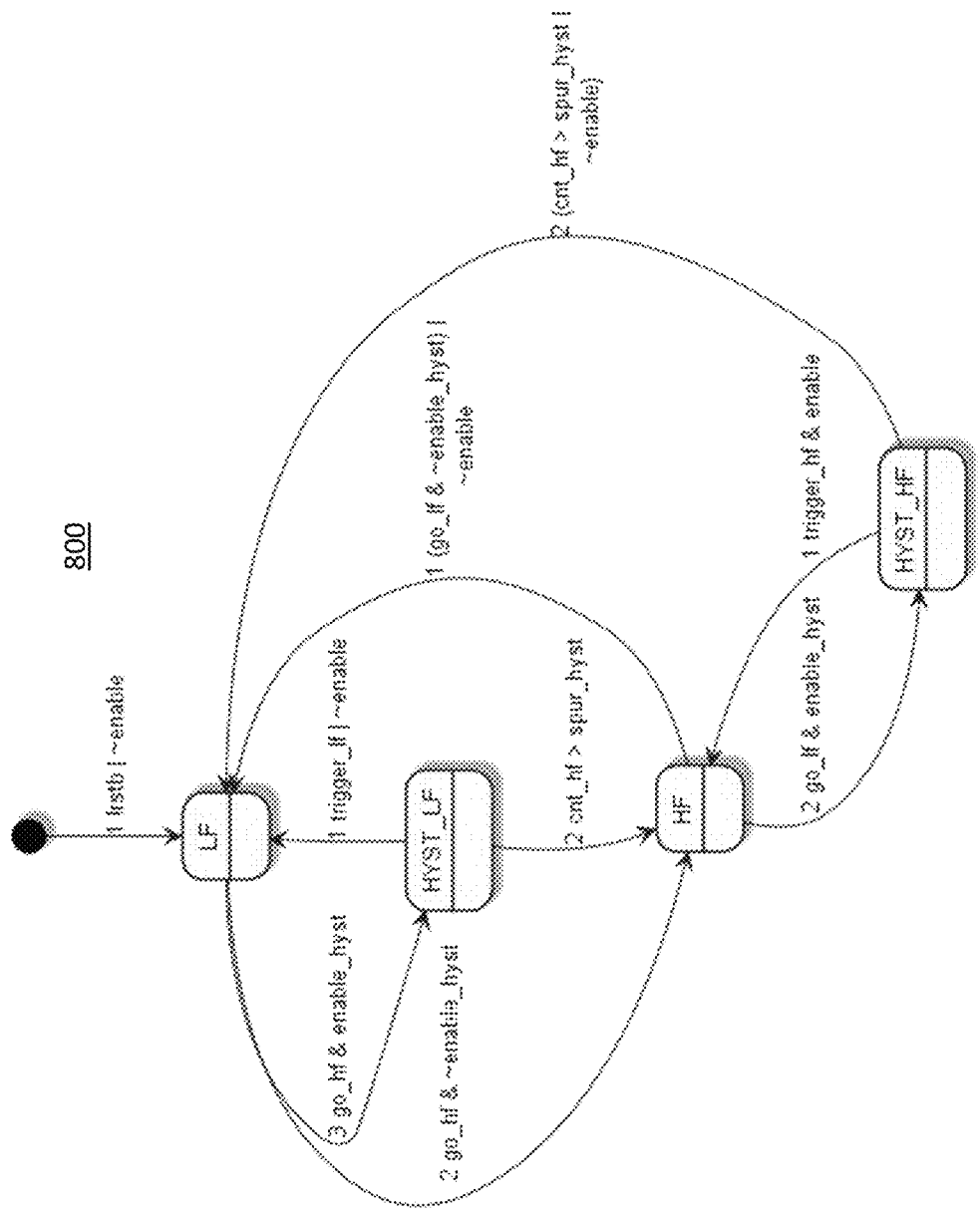
FIG. 8 depicts another example of a state diagram, in accordance with some example embodiments.
Figure 9:
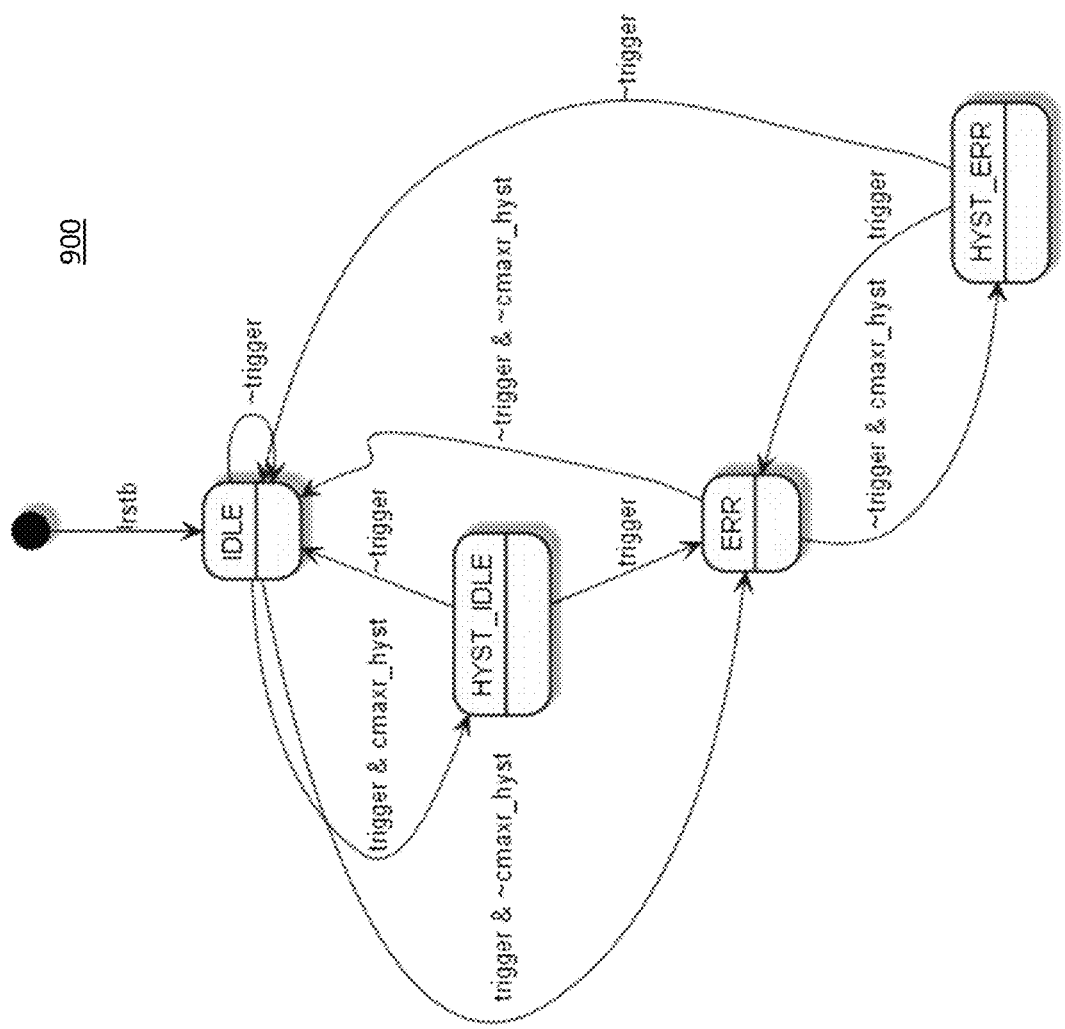
FIG. 9 depicts another example of a state diagram, in accordance with some example embodiments.
Figure 10:
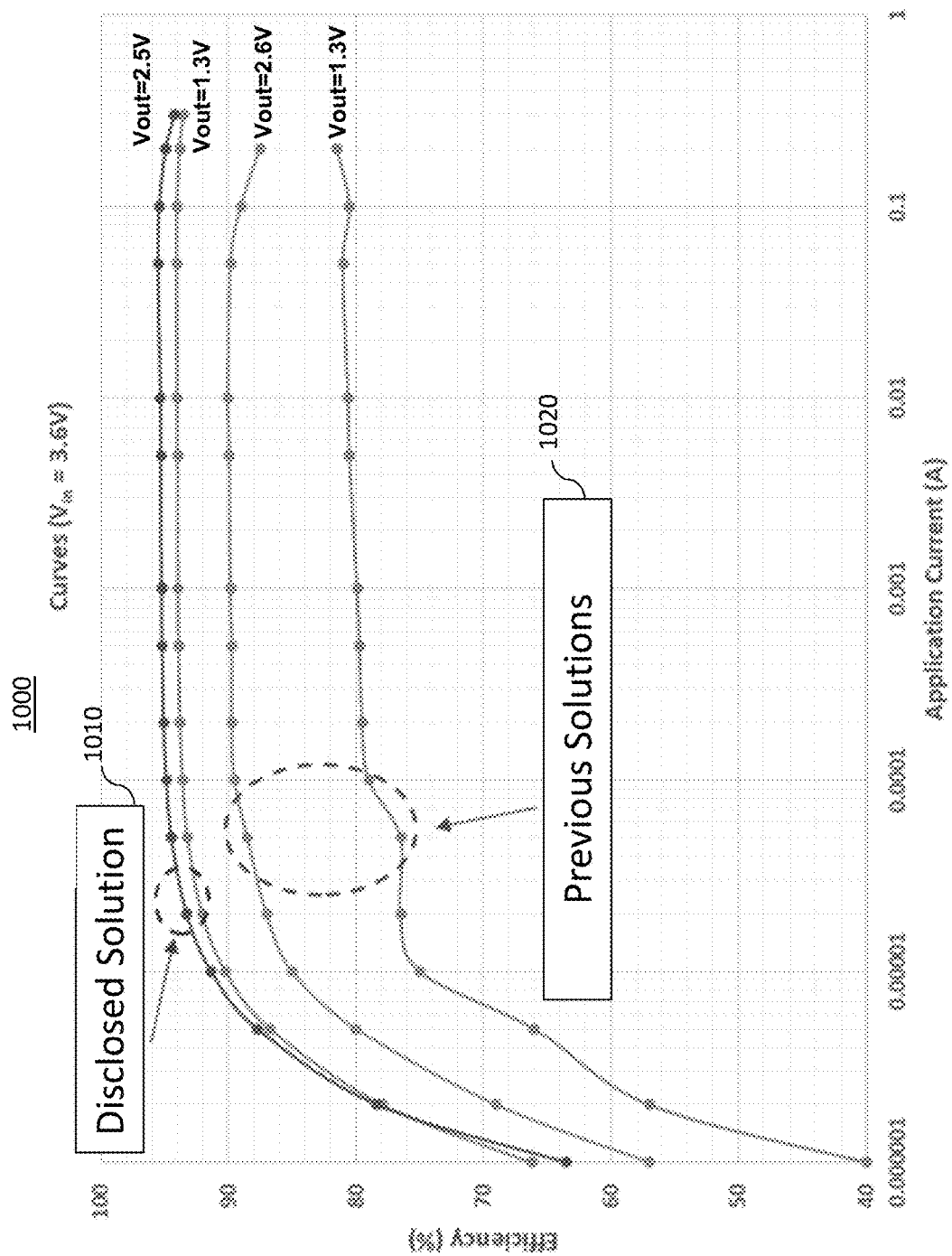
FIG. 10 depicts an example of a graph showing efficiency of the disclosed solution compared to earlier solutions, in accordance with some example embodiments.

FIGS. 1A-1D, 2, and 7-9 depict aspects of the disclosed subject matter, FIGS. 3-6 depict previous approaches to DC-DC conversion, and FIG. 10 depicts a comparison of previous DC-DC converters to some examples of the disclosed subject matter.

The disclosed embodiments, among other features and benefits, enable simultaneous BoM reduction and efficiency improvement. An ultra-low quiescent power consumption, high efficiency, and reduced BoM power management solution is disclosed. The disclosed power management system includes a voltage regulator circuit and process which enables substantial reduction in quiescent power consumption and BoM by reducing the number of passive components required compared to conventional power management schemes. In some embodiments, a single power management integrated circuit (PMIC) is described that uses a single inductor, while providing multiple output voltages having a substantially flat power conversion efficiency curve. In some implementations, a 35% reduction in printed circuit board area and a 70% reduction in the BoM for power management related components is achieved. As noted above, such implementations are well suited for IoT applications, where the size and power consumption are critical components. It is, however, understood that the disclosed embodiments can also be used in other technological areas where reduced power consumption and a small BOM are desired.

These benefits and advantages can be achieved via a power management device and method having several phases. In a first phase, a series of switches are set to charge a capacitor through an inductor. Current flowing through the inductor causes energy to be stored in a magnetic field associated with the inductor. In a second phase, the switches are set to cause the energy in the inductor to be fully transferred to the capacitor. In a third phase, the switches are set to prevent energy stored in the capacitor from being discharged back into the inductor. The transition between the second phase and the third phase may occur when the energy stored in the inductor is zero or nearly zero to ensure that all the energy taken from the battery is transferred to the load. A zero-crossing detector circuit detects when the energy in the inductor is zero. In a fourth phase, the switches are set to short-out the inductor to prevent voltage spikes, resonance and to keep the inductor energy at zero. The third phase and the fourth phase may occur at the same time or nearly the same time. When a comparator determines that the output voltage at the capacitor has dropped to a predetermined value, the process begins again. Progressing through the foregoing four phases may be referred to herein as a power cycle.

The disclosed techniques have many advantages including ultra-high efficiency. In particular, efficiency is improved, at least in-part, by controlling the triggering of the power cycle described above, via the comparator (e.g., the element 147 in FIG. 1A). After the load has drawn enough current out of the capacitor, the comparator triggers the power cycle again, but not before. Each power cycle consumes some energy due to resistances in the circuit. By triggering power cycles only when needed, power is saved by not generating power cycles when not needed by the load. When more power is used by the load, the repetition rate of the power cycles increases, and when less power is needed, the repetition rate decreases.

Another advantage is that the repetition rate of the power cycle may be selected for a given load by choice of an inductance value, capacitance value, and duration of the first and second phases. The duration of the first and second phases determines, at least in part, any spurious signals due to the switching of the switches. Thus, in applications that include radio frequency circuits, by controlling the duration of the first and second phases spurious signals radiated or conducted signals can be selectively minimized or kept below a predetermined level to avoid noise and/or interference with the radio frequency transmitter and/or receiver. As will be described in a later section of this document, the disclosed embodiments allow spurious signals at these sensitive frequencies to be avoided by bypassing a band of power cycle repetition frequencies that contribute to such spurious signals, while selectively operating at other frequencies. In some embodiments, instead of minimizing the spurious radiated or conducted signals, the spurious radiated or conducted signals may be selectively eliminated. Because larger inductance values store more energy in the magnetic fields of the inductor, in some embodiments, selecting a larger inductance value allows for a lower repetition rate of the power cycle. A capacitor with larger capacitance value may result in a lower repetition rate. Another advantage is that the disclosed circuits can be used to produce multiple independent output voltages with a single inductor. The inductor may be time-shared between multiple output stages.

Figure 1A:
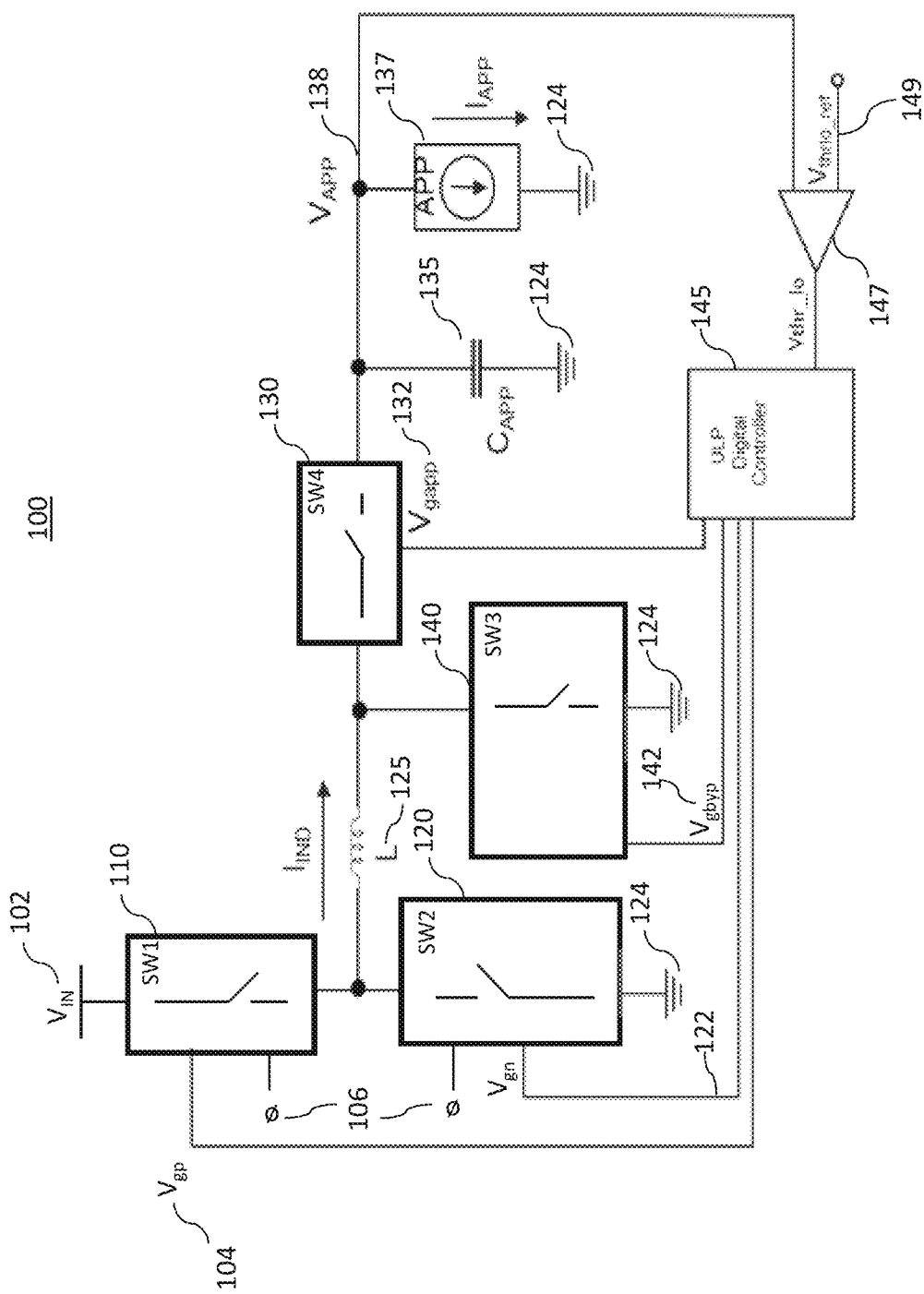
FIG. 1A depicts an example of an integrated power management system, in accordance with some example embodiments.

FIG. 1A depicts an example of an integrated power management system 100, in accordance with some example embodiments. FIG. 1A includes switches 110, 120, 130, and 140, capacitor 135, inductor 125, comparator 147, controller 145, and application load 137. Throughput the phases of a power cycle, controller 145 causes switches 110, 120, 130, and 140 to be open (open-circuited) or closed (short-circuited).

In the first phase of a power cycle, controller 145 causes switch 110 to close via control signal 104, causes switch 120 to open via control signal 122, causes switch 130 to close via control signal 132 and causes switch 140 to open via control signal 142. With the switches in the foregoing positions, current flows from input voltage 102 through switch 110 to inductor 125, through inductor 125 to switch 130, through switch 130 and into capacitor 135 and load 137. Inputs 106 in FIG. 1A may or may not be required depending on the architecture and implementation strategy of 110 and 120 in FIG. 1A (stacked PMOS or NMOS, all NMOS, NMOS/PMOS, etc.).

In the second phase of the power cycle, controller 145 causes switch 110 to open via control signal 104, causes switch 120 to close via control signal 122, causes switch 130 to remain closed via control signal 132 and causes switch 140 to remain open via control signal 142. With the switches in the foregoing positions, energy stored in the magnetic fields surrounding inductor 125 produce a current that flows through switch 130 and into capacitor 135 and load 137.

In the third phase of the power cycle, controller 145 causes switch 110 to remain open via control signal 104, causes switch 120 to remain closed via control signal 122, causes switch 130 to open via control signal 132 and causes switch 140 to remain open via control signal 142. With the switches in the foregoing positions, capacitor 135 is disconnected from the inductor thereby preventing energy stored in the capacitor 135 from flowing back into the inductor.

In the fourth phase of the power cycle, controller 145 causes switch 110 to remain open via control signal 104, causes switch 120 to remain closed via control signal 122, causes switch 130 to remain open via control signal 132 and causes switch 140 to close via control signal 142. With the switches in the foregoing positions, both sides of inductor 125 are connected to ground 124 through switches 120 and 140 thereby shorting both sides of inductor 125 to ground 124. The inductor is shorted to ground when the energy stored in the inductor reduces to zero.

The voltage produced at the output 138 by the power management system 100 may be different from the input voltage 102. Voltage 138 is lower or equal to voltage 102. Voltage 138 is provided to load 137 and the charge stored in capacitor 135 is provided to load 137. As load 137 reduces the charge stored in capacitor 135, output voltage 138 drops. When voltage 138 drops to a predetermined value set by voltage reference 149, comparator 147 triggers controller 145 to start another power cycle. A load 137 that draws more current from capacitor 135 will cause voltage 138 to drop more quickly thereby causing the time between triggers from comparator 147 to be reduced. Accordingly, for a given capacitance value at 135 and inductance at 125, a load 137 drawing more power from capacitor 135 has a higher comparator repetition frequency than a load drawing less power. Selecting a smaller inductance value for inductor 125 and/or smaller capacitance value at capacitor 135 also increases the power cycle repetition frequency because less power is stored in inductor 125 and capacitor 135. Similarly, selecting a larger inductance value for inductor 125 and/or larger capacitance value at capacitor 135 decreases the power cycle repetition frequency because more power is stored in inductor 125 and capacitor 135. In this way, power management system 100 generates power cycles when additional load power is needed at 137 and less frequent power cycles are generated when load 137 requires less power. Generating power when load 137 demands power and not generating power when additional power is not needed by load 137 increases the efficiency of power management system 100 over other approaches. Less frequent power cycles dissipate less power in the power converter by reducing losses due to parasitic resistances and reducing switching throughout power management system 100. The quiescent power of the converter changes based on the value of the current drawn by application 137. The power converter quiescent current scales with load current to maintain performance without sacrificing power efficiency.

Whenever electronic circuits are being switched, the circuits generate conducted and radiated spurious signals. The spurious signals have frequency components corresponding to the Fourier components of the switching. For example, square wave switching signals generate odd harmonics with the fundamental frequency corresponding to the inverse of the square wave cycle rate. Many applications including radio frequency transmitters and particularly radio frequency receivers have sensitivities to particular frequencies such as reception frequencies and intermediate frequencies in the transmission and reception signal processing chains. Improved receiver sensitivity and transmitter performance may be achieved when power supply circuits and other circuit avoid these sensitive frequencies. The instant power management system 100 provides a technique to avoid these sensitive frequencies. For a given load, by selecting the inductance value for inductor 125 and the capacitance value for capacitor 135 the power cycle repetition rate can be tailored to prevent spurious signals from being generated at the sensitive frequencies for the receiver and/or transmitter. In this way, the frequencies of spurious signals are user programmable. The user programmable spurious signal management disclosed above is achieved, at least in part, by changing the duration of the time the inductor is charged and discharged for a particular load 137, output voltage 138, input voltage 102, inductor 125, and capacitor 135.

In some example embodiments, switches 110, 120, 130, and 140 are implemented on a single integrated circuit. Controller 145 and/or comparator 137 may be included in the same integrated circuit as switches 110, 120, 130, and 140, or may be implemented on a different integrated circuit. Inductor 125 may be a discrete component that is external to the integrated circuit or it may be an integrated into the integrated circuit. In some implementations, capacitor 135 may be implemented in the integrated circuit and in other implementations capacitor 135 may be a discrete component external to the integrated circuit. The application circuit that uses the generated voltages may also be implemented in the integrated circuit or may be a separate integrated circuit or printed board.

Figure 1B:
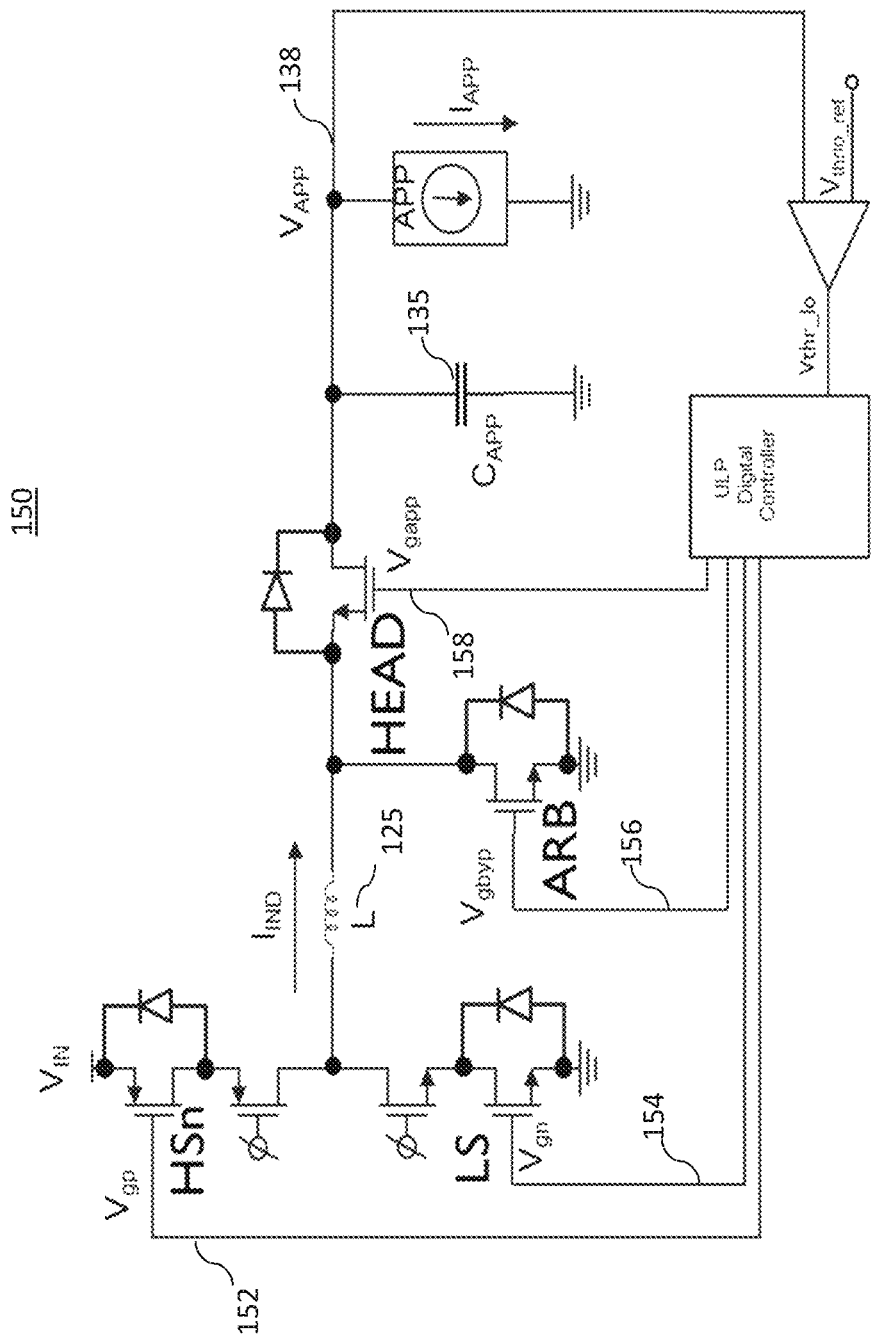
FIG. 1B depicts another example of an integrated power management system, in accordance with some example embodiments.

FIG. 1B depicts another example of an integrated power management system, in accordance with some example embodiments. FIG. 1B depicts a circuit similar to FIG. 1A with switches 110, 120, 130, and 140 implemented by metal oxide semiconductor field-effect transistors (MOSFETs). MOSFET protection diodes inherent to the devices are shown in FIG. 1B. Control signals 152, 154, 156, and 158 control the switches as shown. The switch corresponding to control signal 152 is shown as being implemented in p-type MOSFET, the switches corresponding to control signals 154, 156, and 158 are shown as being implemented in n-type MOSFET. Each switch may be implemented as either n-type or p-type which may be different than what is shown in FIG. 1B. Although FIG. 1B shows MOSFETs, other types of semiconductor devices that can be used as a switch can be used instead. For example, field-effect transistors (FETs), bipolar junction transistors (BJTs), or any other semiconductor switch may be used.

Figure 1C:
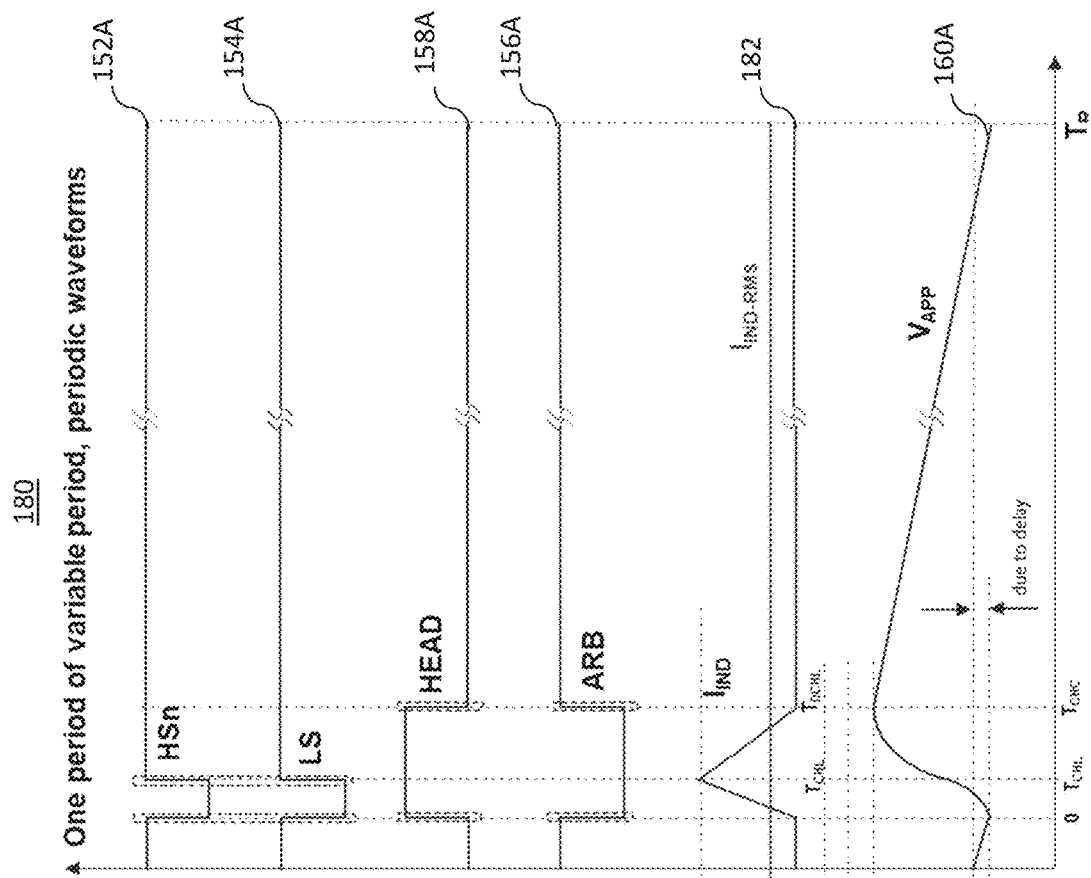
FIG. 1C depicts examples of waveforms produced by an integrated power management system, in accordance with some example embodiments.

FIG. 1B shows the integrated power management (IPM) with a digital controller for a single domain (e.g., a single regulated output voltage). The inductor (L) 125 and capacitor ($C_{app}$) 135 are off-chip. Whenever the application voltage 138 drops below the programmed reference voltage, the comparator will indicate this (on Vthr_lo) to the digital controller which will then close the power MOSFET switch (using HSn and LS signals) for a predetermined amount of time ($T_{mag}$). This causes a constant battery voltage (Vin) to appear at the inductor input. Recalling that the equation for the inductor voltage (V) as function of current (i) and time (t) is V=Ldi/dt, a constant voltage across the inductor causes a linear current to charge and store magnetic energy in the inductor. The Head switch is also closed which allows current to pass through to the load capacitor. After the predetermined time is finished, the power MOSFET switch is opened (using HSn open, LS closed) which causes the inductor input voltage to be at ground. As a result, the inductor starts to discharge (and release its magnetic energy) and the current through the inductor starts decreasing linearly. The Head switch is still closed and the load capacitor is still being charged. Once the inductor current reaches zero or a predetermined amount of time has passed ($T_{demag}$), the head switch is opened to stop the load capacitor from starting to lose charge back to the IPM. At this point, the load capacitor starts discharging according to the load current. Additionally, the ARB switch is closed to ground the inductor output and avoid any oscillations/ringing. At this point the controller will wait some time to allow the comparator to update its output. Then, the whole process will repeat again every time the load voltage drops below the comparator threshold. Under heavy loading, the comparator will be triggered more often. Under light loading, the comparator will trigger less often. The current in the inductor will be independent of the loading, but will depend on the $V_{IN}$-$V_{app}$ difference FIG. 1C depicts examples of waveforms produced by an integrated power management system, in accordance with some example embodiments. These plots correspond to the example configuration of FIG. 1B. At 152A, a plot of the voltage waveform at control line 152 for the p-type MOSFET switch HSn is shown. The p-type switch is "on" when the voltage waveform is low and "off" when the voltage is high. At 154A, a plot of the voltage waveform at control line 154 for the n-type MOSFET switch LS is shown. The n-type switch is "on" when the voltage waveform is high and "off" when the voltage is low. Some guard time is shown by the dashed lines in the voltage plots. The guard provides for a small delay between turning "off" switch LS and turning "on" switch HSn to prevent both switches from being "on" at the same time wasting power and possibly damaging the switches. At the start of the power cycle, control line 158 turns "on" the MOSFET switch Head and control line 156 turns "off" the MOSFET switch ARB. With switch LS "off" when switch HSn is turned on, current starts flowing through the inductor increasing linearly as shown at 182. When switch HSn is turned "off" and LS turned "on", the magnetic fields in the inductor continue to flow at a linearly decreasing rate due to the decaying fields as shown at 182. At 160A, the corresponding output voltage waveform, $V_{APP}$, 160A is shown which increases throughout the period when current is flowing through the inductor. The waveforms at 152A,

154A, 156A, and 158A may be referred to as one-shots. A one-shot is a circuit that produces a rectangular pulse of a predetermined duration. The duration may be referred to as a pulse width.

Figure 1D:
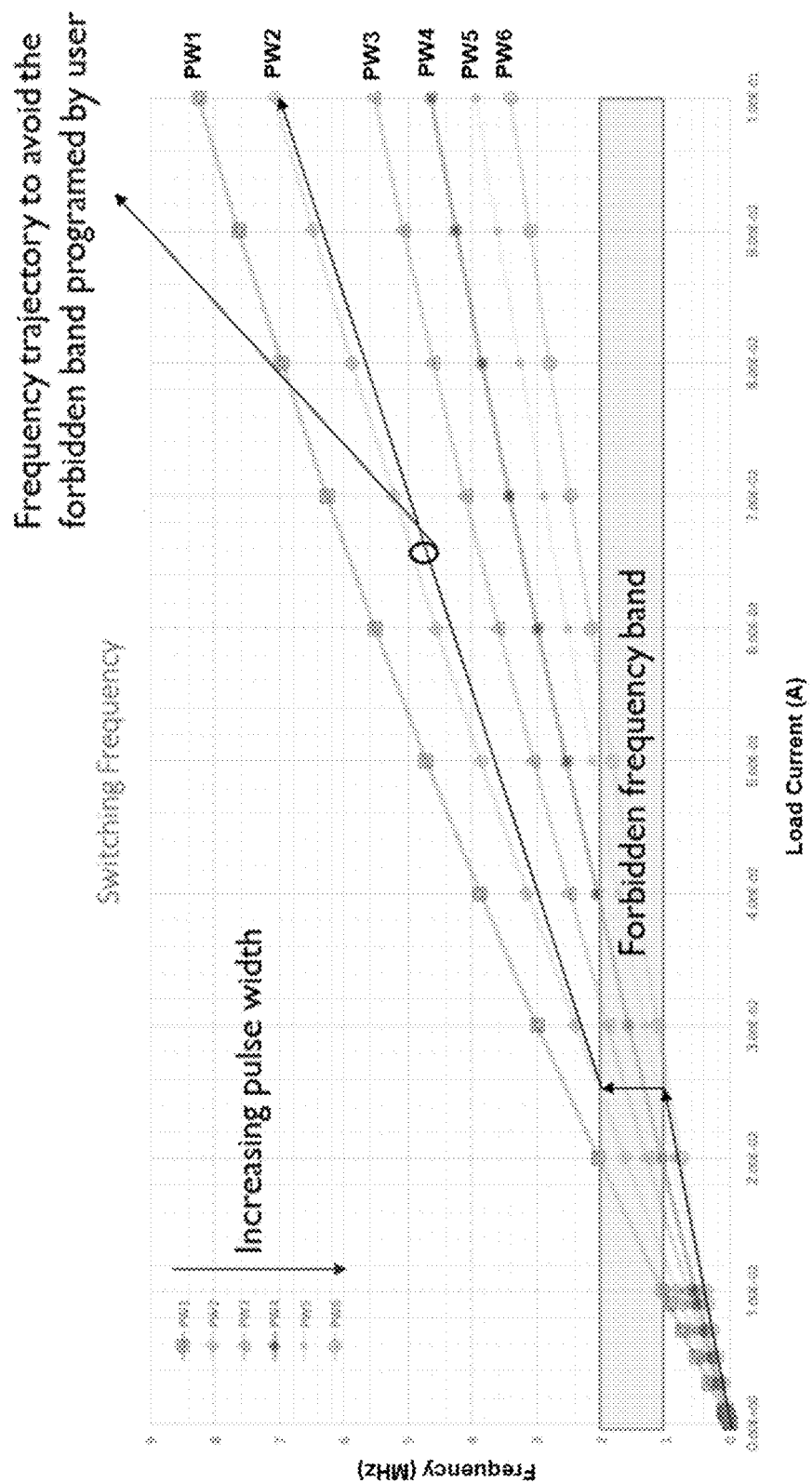
FIG. 1D depicts example plots showing management of spurious emissions, in accordance with some example embodiments.

FIG. 1D depicts example plots showing management of spurious emissions, in accordance with some example embodiments. Management of spurious emissions (spurs) may be performed by controlling the repetition rate of the power cycle. In the example shown in FIG. 1D, spurs are shown as a function of load current for a variety of pulse widths of inductor drive current (the first phase above). Also shown in FIG. 1D is a band of frequencies between 1 MHz and 2 MHz where spurs are to be avoided. As the load current increases, the frequency of the spurs increases for each pulse width. As the current increases to where the frequency of the spurs reach 1 MHz, a different pulse width is selected so that the spurs at the new pulse width are outside the 1-2 MHz band. The foregoing is an illustrative example, and any other spur frequencies can be avoided using the same technique. In the case of multi-output implementations, the spurs resulting from mixing products (i.e., from different outputs) can also be managed in a similar manner by managing the pulse width associated with each domain separately so that the mixing spur products are still outside the forbidden frequency band defined by the user.

Figure 2:
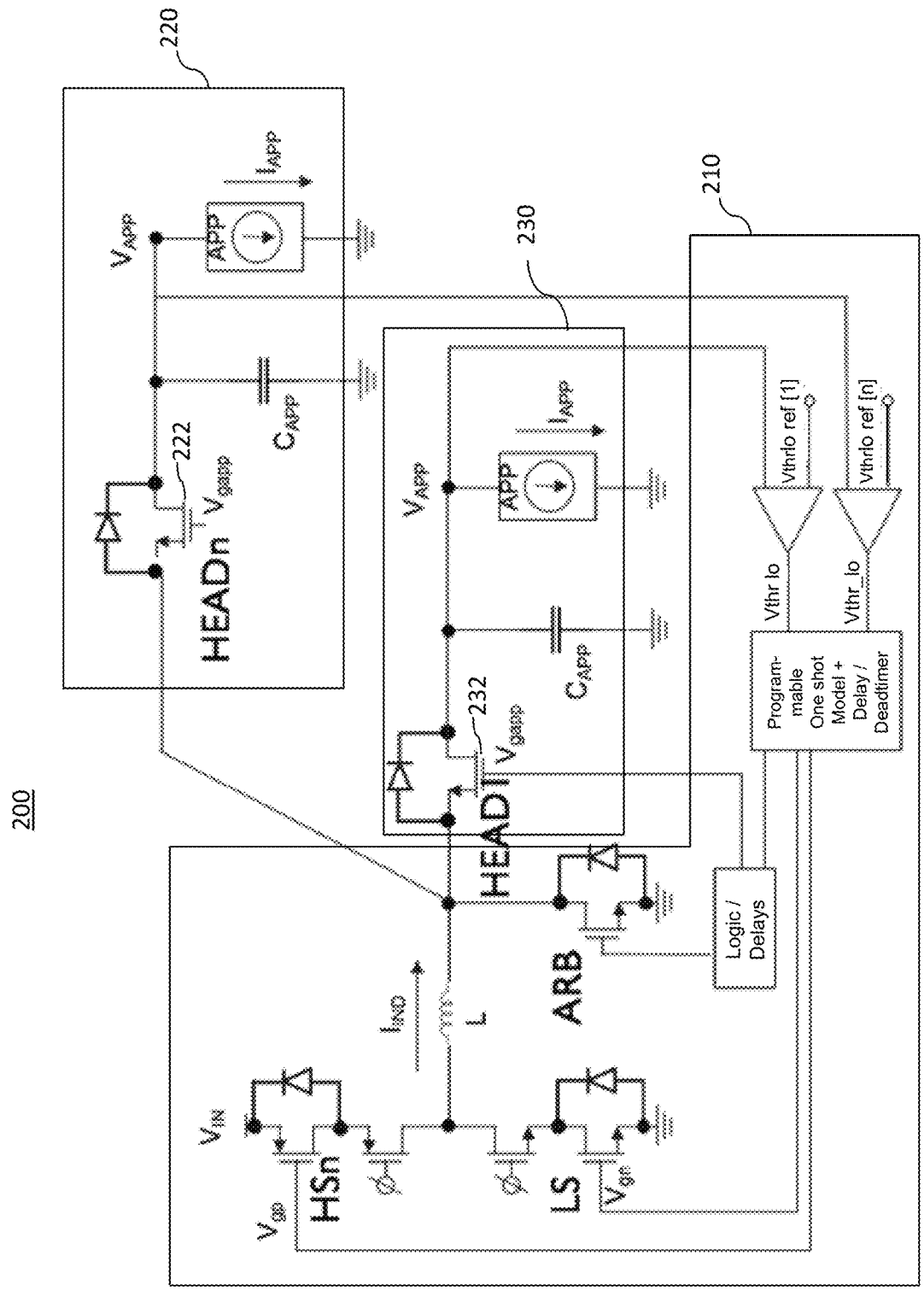
FIG. 2 depicts an example of an integrated power management system producing multiple outputs, in accordance with some example embodiments.

FIG. 2 depicts an example of an integrated power management system producing multiple outputs, in accordance with some example embodiments. "Front-end" circuit 210 including one of the two comparators combined with back-end circuit 220 is the same circuit as FIG. 1B. "Front-end" circuit refers to the circuit topology within 210 and "back-end" circuit refers to the circuit topology within 220/230 in FIG. 2. FIG. 2 shows an additional back-end circuit 220. Each back-end circuit 220, 230 produces an independent output; thus additional back-end circuits may be configured to implement additional outputs. The output voltage of each back-end circuit may be the same or a different voltage, having the same or different load current. Each output may be referred to as a domain. In the example of FIG. 2, the single inductor in the front-end circuit 210 provides current to multiple back-end circuits 2230/230 that each operate at different times. In this way, the inductor is time-shared between different back-end circuits to support multiple voltage domains. For example, in a first time period, switch 222 (shown as HEADn implemented as a MOSFET) may be turned on and switch 232 (shown as HEAD1 implemented as a MOSFET) may be turned-off. Front-end circuit 210 may charge the capacitor in back-end circuit 220 as described above during the first time period. In a second time period, switch 222 may be turned "off" and switch 232 may be turned "on." Front-end circuit 210 may charge the capacitor in back-end circuit 230 as described above during the second time period. In this way, multiple domains may be served by a single inductor thereby reducing size, weight, cost, and power consumption. Cross-regulation between multiple domains is eliminated in this scheme by ensuring that the inductor energy is zero before serving another domain with a power cycle.

The multiple back-end circuits may be provided a power cycle by a controller on a round robin basis, a priority basis, or based on any other scheme for sharing a resource with multiple consumers. For example, a system with three back-ends may be served by the front-end in the following way: the front-end may provide a power cycle to a first back-end during a first cycle, a second back-end during a second cycle, a third back-end during a third cycle, the first back-end again during a fourth cycle and so on. In another example, the first back-end may have a higher priority than the second back-end so that whenever the first back-end requires a power cycle (determined via a comparator and threshold voltage associated wot the first back-end) the front-end provides a power cycle. In this example, with three back-ends, the second and third will be provided a cycle at times when the first back-end comparator is not triggered. One of the second and third back-ends may have priority over the other while having a lower priority than the first back-end. Other schemes of allocating a scarce resource may also be used.

The loop delay of the system (power management circuit and controller) results in voltage droop at the load, thus a voltage margin may be added to account for the delay. Minimizing the voltage margin (accordingly the loop delay) reduces power waste and inefficiency. Multi-domain inductor sharing may cause additional loop delay (because a domain might need to wait until other domains finish being serviced) and accordingly may require additional voltage margin. But inductor sharing has the advantage of saving cost at the system level by requiring fewer inductors. The controller may use multiple pulse widths ($T_{mag}$ and $T_{demag}$) based on a lookup table to optimize efficiency, voltage ripple, and noise frequency. The controller produces tightly controlled pulse widths which may be achieved by using a fast clock (e.g., 500 MHz) to provide high-resolution timing (e.g., 2 ns with a 500 MHz clock). A unit delay (e.g., 2 ns) can also be generated using a delay line instead of a ring oscillator or any other means of generating a unit delay. Any other delay can also be generated. Typically, the larger the inductance value of the inductor, the larger the unit delay can be before regulator performance is compromised. The fast clock may be generated by a digital ring oscillator with a programmable number of invertor stages. The controller may also adjust the pulse widths to keep the switching noise outside of a user programmable band (based on the frequency band used by the sensitive RF circuits as described above). For high efficiency power management, both the analog and the digital components operate using very low power.

Figure 3:
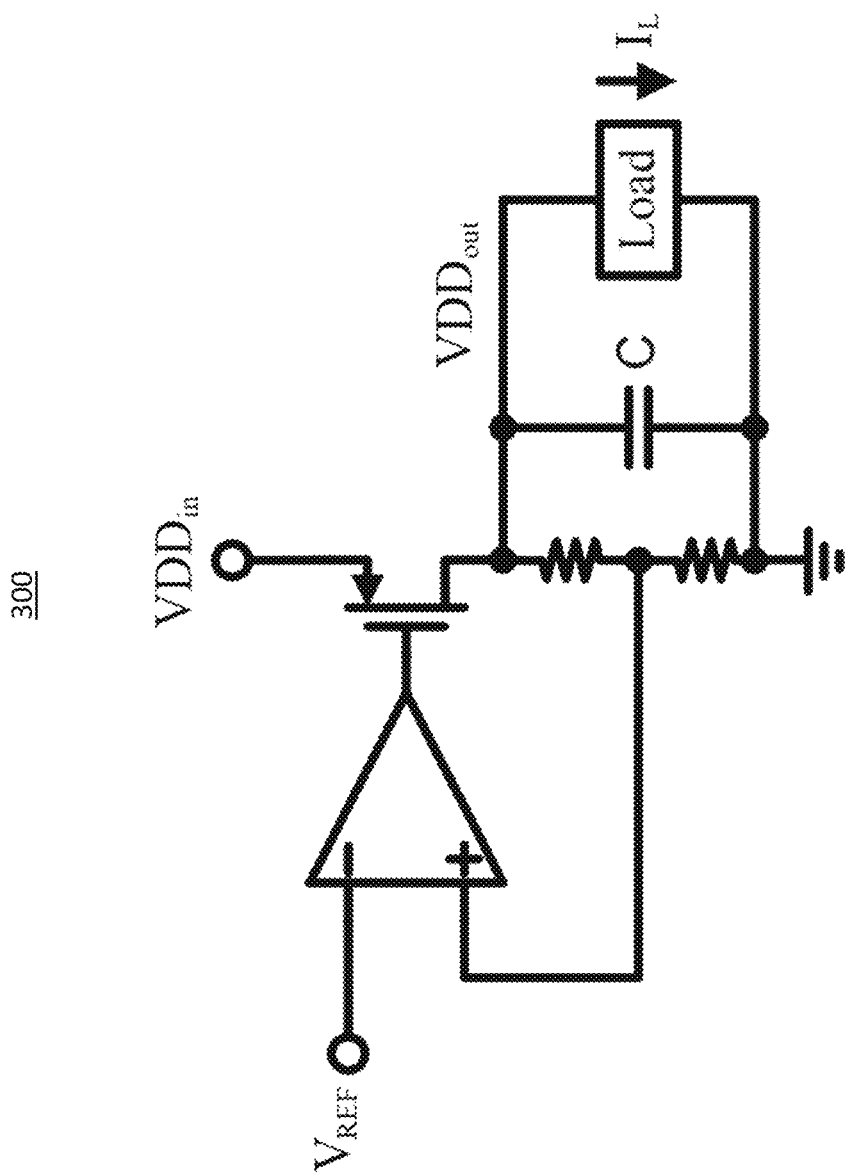
FIG. 3 depicts an example of a voltage regulator circuit, in accordance with some example embodiments.

FIG. 3 depicts an example of a voltage regulator circuit, in accordance with some example embodiments. A voltage regulator may be referred to as a power supply. The regulator's purpose is to keep the voltage at the load at a specified constant value, regardless of changes to the load current. Voltage regulators can be classified based on the type of their input and output voltages (e.g. DC/DC, alternating current to alternating current (AC/AC), and AC/DC). A DC/DC regulator has DC voltage input (e.g., from battery) and produces a DC voltage output. An AC/DC voltage regulator takes an AC input voltage (e.g. from wall electric outlet) and produces a DC voltage output.

DC/DC regulators may include power MOSFETs (transistors with large widths to handle high load currents) connected to the input supply with a feedback loop to maintain the voltage at the specified level. DC/DC regulators can be subdivided into linear regulators and switching regulators. Linear regulators utilize the power FET as a variable resistor to adjust the output voltage, while switching regulators utilize the power FET as a switch (e.g., "off" or "on" in saturation).

Linear regulators have some advantages. They are cost/area efficient, low noise, provide fast transient response, and provide low output ripple. Linear regulators do have some drawbacks, as well. One drawback is that linear regulators can only provide an output voltage that is lower than the input voltage and can drop out of regulation if the output voltage gets too close to the input voltage. The drop out voltage is the minimum voltage difference needed between the input and output voltages. Low-drop-out regulators (LDOs) are linear regulators designed to have low dropout voltages. Another drawback of linear regulators is that they may have low efficiency if the output voltage is significantly less than the input voltage. The efficiency of linear regulators may be limited by the ratio of the output voltage to the input voltage.

An advantage of switching regulators is that they offer high efficiency. Consider the example of a system on a chip (SoC) where a 0.9V voltage is required to be produced from a 3.6V battery. If an LDO is used, then the efficiency would be limited to only 25% (i.e., 0.9V/3.6V). However, a switching regulator may provide higher efficiency in the same situation. Another advantage of switching regulators is the ability to produce an output voltage that is higher than the input voltage (using an inductor). This type of switching regulator is a boost converter. When the output voltage is lower than the input voltage, it may be referred to as a buck converter. In some implementations, a buck-boost converter can provide an output voltage magnitude that is either greater than or less than the input voltage magnitude. For example, buck converter can be combined with a boost converter. One major drawback of switching regulators is the need for an inductor, which is off-chip, and accordingly adds cost. Another drawback of switching regulators is that they may produce high frequency switching noise which may be coupled to the rest of the SoC through the ground and power lines and through radiated or conducted electromagnetic interference. This is problematic if the SoC contains sensitive RF circuits as described above.

FIG. 3 shows a LDO regulator. Basically, the power MOSFET acts as a programmable resistor that the feedback amplifier adjusts to keep the VDDout (through the resistor divider) tracking Vref. The load voltage (VDDout) can be controlled by adjusting the reference voltage (Vref).

Figure 4:
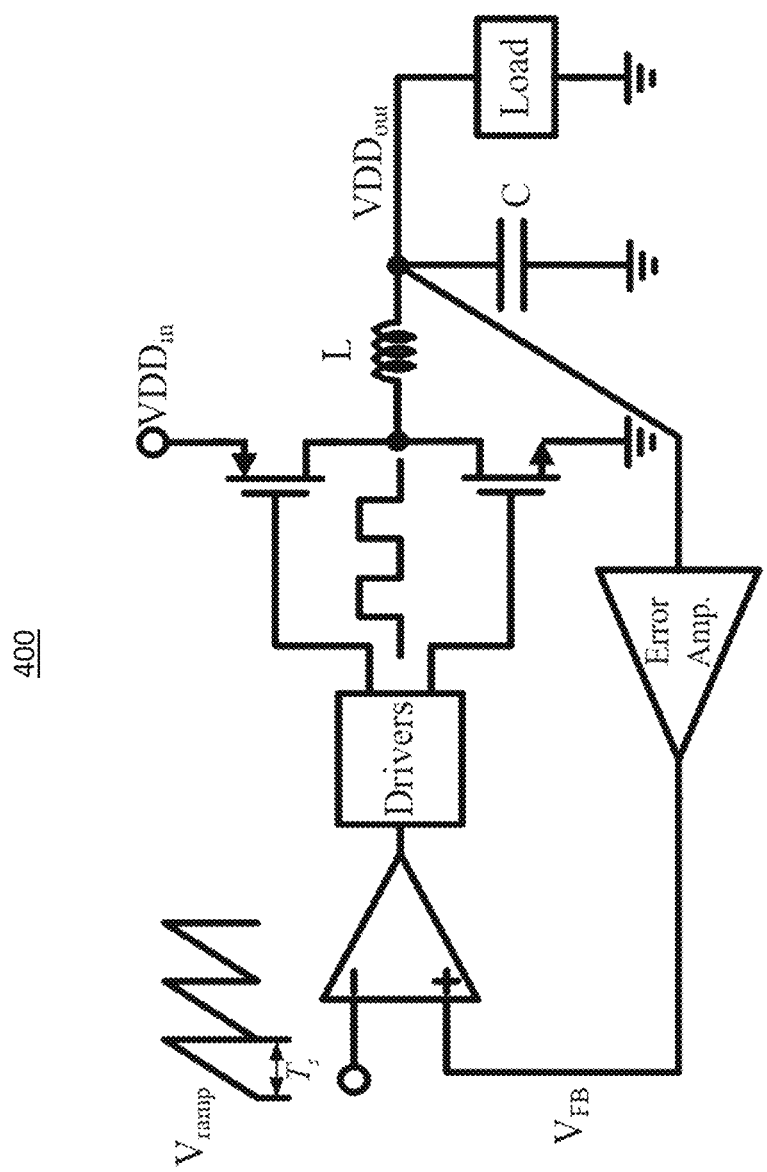
FIG. 4 depicts an example of a buck converter, in accordance with some example embodiments.

FIG. 4 depicts an example of a buck converter, in accordance with some example embodiments. Basically, the power MOSFET acts as a switch controlled by a pulse-width modulated (PWM) signal to produce square pulses of a predetermined duty cycle. The LC circuit acts as a low pass filter to produce a DC voltage proportional to the duty cycle of the PWM. VDDout is controlled by adjusting the duty cycles of the PWM control signal.

An LDO may be less efficient because it dissipates (wastes) the excess energy (due to the current caused by the difference between the input battery voltage VDDin and output load voltage VDDout) through the power MOSFET linear mode resistance as heat; while a switching regulator draws current from the battery across low resistance of MOSFET saturation mode on switch, stores (no waste) the energy from that current in the inductor and releases it to the load at the load voltage.

Figure 5:
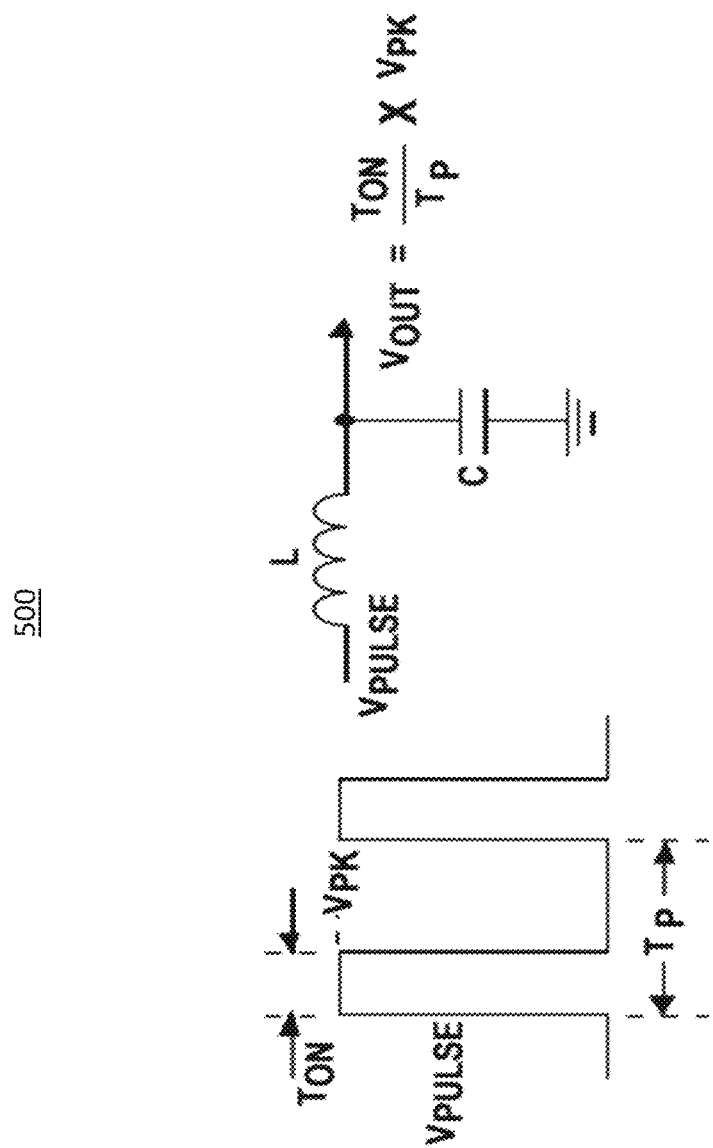
FIG. 5 depicts another example of a buck converter, in accordance with some example embodiments.

FIG. 5 depicts another example of a buck converter circuit, an associated waveform, and equation, in accordance with some example embodiments. The inductor output voltage is proportional to the duty cycle of the pulses input to the inductor.

Figure 6:
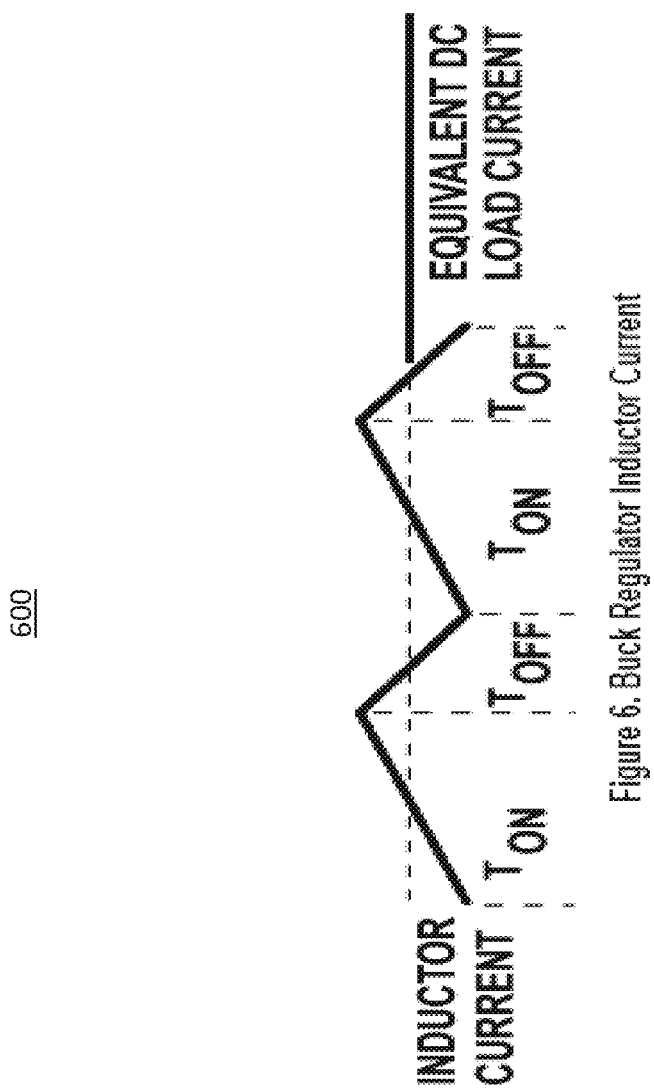
FIG. 6 depicts another example of a waveform, in accordance with some example embodiments.

FIG. 6 depicts another example of a waveform, in accordance with some example embodiments. In FIG. 6, the inductor (inductance L), current (i), and voltage (V) may be expressed as: V=L(di/dt) which results in an increasing linear current when a constant voltage is applied across the inductor during $T_{on}$, a period when the battery is connected to the inductor (corresponding to the first phase described above). The current is then decreasing linearly when a negative constant voltage is applied across the inductor during the $T_{off}$ time when the battery is disconnected (corresponding tot the second phase described above).

Some example embodiments include overcurrent protection circuitry to protect the electronic components (battery, transistors, inductors, capacitors, wires) from being destroyed in case the load experiences a short circuit which would otherwise draw an excessively large current from the battery and cause permanent damage. Such a circuit would shut-off the regulator and disconnect the load once the over-current condition is detected.

Figure 7:
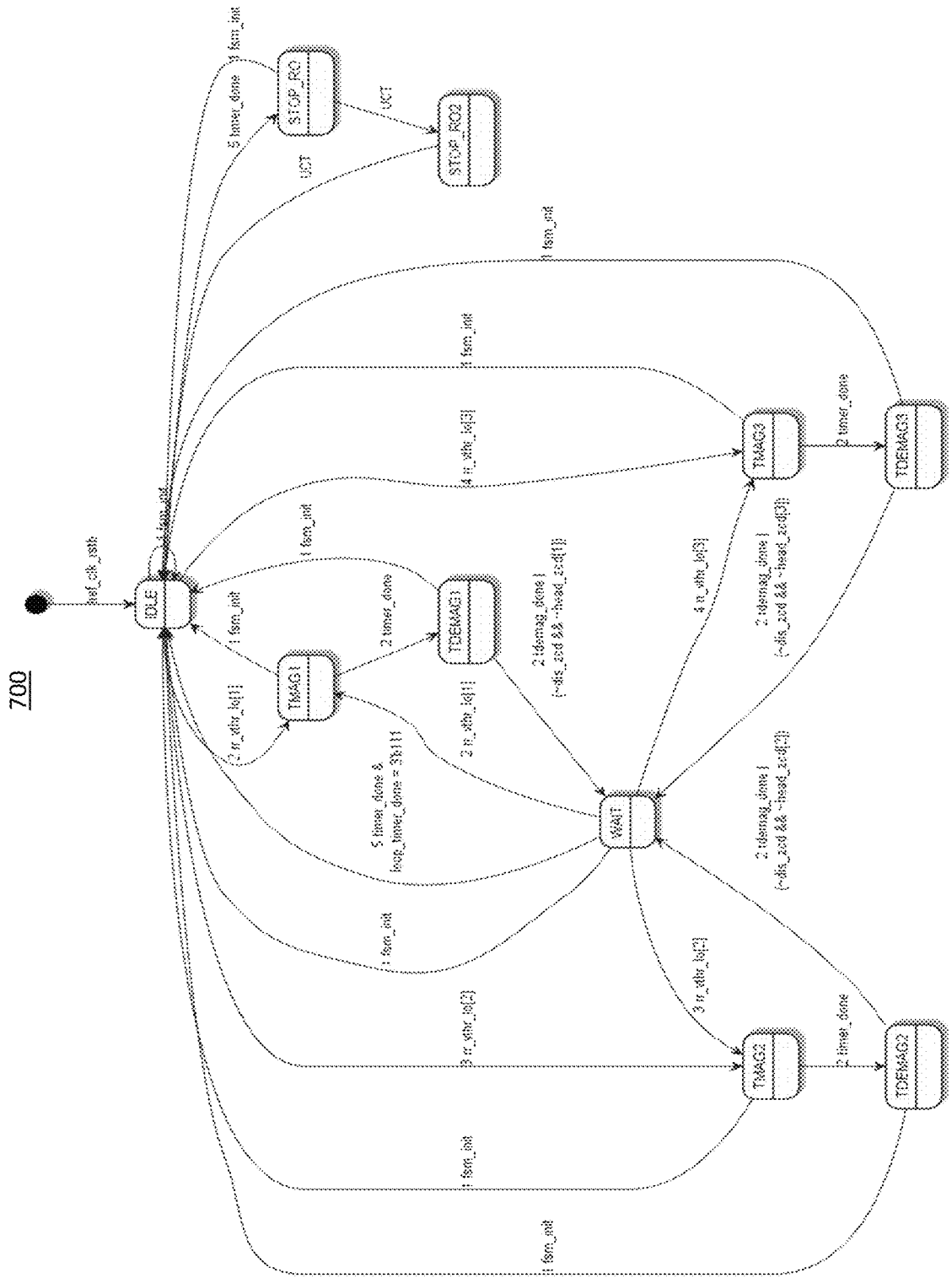
FIG. 7 depicts an example of a state diagram, in accordance with some example embodiments.

FIG. 7 depicts an example of a state diagram for a power management controller supporting multiple output voltages, in accordance with some example embodiments.

Using scheduling inside the controller, multi-domains can be provided charge by time-interleaving the charge cycles as described above. The time-interleaving may be based on priority, based on a round-robin scheme, another scheme or a combination of schemes. Each domain regulated includes its own comparator, HEAD switch (also referred to as switch 130 in FIG. 1A, switches 222, 232 in FIG. 2) and associated capacitor $C_{APP}$ (also referred to as capacitor 135 in FIG. 1A).

After being reset, the state machine starts in the IDLE state. Once the a Vthr_lo signal is triggered from a comparator, the state machine starts charging the capacitor associated with the trigger. The state TMAG<X> indicates the magnetization state for domain X. After the timer for charging has expired, the state machine enters the demagnetization state which is indicated by TDEMAG<X>. After charging of the capacitor has completed, the state machine goes into the WAIT state to check if any other domain capacitors need to be recharged. If this timer expires the state machine returns to the IDLE state.

While in the IDLE state, the controller waits to see if any domain needs to be charged. If after a brief timeout no charge requests from domains are received, then the controller will proceed to the STOP_RO state to shut-down the ring oscillator. The STOP_RO2 state accommodates the time to stop the ring oscillator so that no glitches are introduced.

The WAIT introduces a delay to allow the comparator output to stabilize before a decision is made on whether or not initiate a consecutive power cycle. This delay allows the feedback loop to stabilize. Otherwise, without the delay, the controller may initiate an unwanted consecutive power cycle based on old information from the comparator resulting in excessive voltage ripple. Since separate wait timers are maintained for each domain, the controller may exit the wait state to service another domain, but it cannot service the same domain a second time until its associated wait timer has expired.

The repetition frequency of the power cycle is a function of the load current and amount of charge delivered. By controlling the amount of charge cycles per time, the frequency of firing can be controlled. This is achieved by modulating the Tmag time. Frequency management allows for the controller to control the amount of charge delivered to the domain capacitor, thereby also controlling the frequency that the capacitor requires recharging. Accordingly, with a constant load current, if a little charge is delivered to the capacitor the domain will request to be recharged sooner (higher power cycle repetition rate). If more charge is delivered, then the domain will request to be recharged later (lower power cycle repetition rate).

FIG. 8 depicts another example of a state diagram for implementing frequency management, in accordance with some example embodiments. The state machine starts in state LF, the low frequency state. In this state, larger pulse-widths are used (i.e., the charging cycle is longer). The number of comparator triggers is tracked by a counter, which resets at a periodic rate. If the counter exceeds a certain number of firings, the state can transition to HYST_LF or HF. HYST_LF provides hysteresis or a delay before changing the pulse width to be smaller. In HF, a shorter pulse width is fired, increasing the recharging frequency. The counter limits and the hysteresis limits may be programmable via registers.

FIG. 9 depicts another example of a state diagram for detection of a maximum current, in accordance with some example embodiments. The controller allows for checking the maximum current conditions based on the number of times the controller fires a power cycle within a sample clock period. If a predetermined threshold is exceeded, then an error signal is generated. The maximum current detecting state machine starts in IDLE. Each time a trigger occurs, the counter increments. A hysteresis state allows for the filtering of spurious glitches. In some example embodiments, the hysteresis allows for the error signal to be active for a certain number of cycles before asserting the error. HYST_IDLE and HYST_ERR states are designed to prevent false alarm for getting out of IDLE mode and enter/exit a max current error mode due to glitches. When max current threshold is reached, the system enters HYST_IDLE first and stays there for a programmable number of cycles (until corresponding timer expires) before asserting error. Similarly, when max current error is asserted, the system enters HYST_ERROR state first and stays there for a programmable number of cycles (until corresponding timer expires) before de-asserting error.

FIG. 10 depicts an example of a graph showing efficiency of the disclosed solution compared to earlier solutions, in accordance with some example embodiments. FIG. 10 depicts DC-DC converter efficiency verses output current for a variety of converter output voltages. Previous DC-DC converters have lower efficiency than the disclosed converter. Previous DC-DC converters also have ripples in their efficiency vs. output current performance curve, whereas the efficiencies achieved through the disclosed embodiments exhibit a flat characteristic as shown in FIG. 10.

Figure 11:
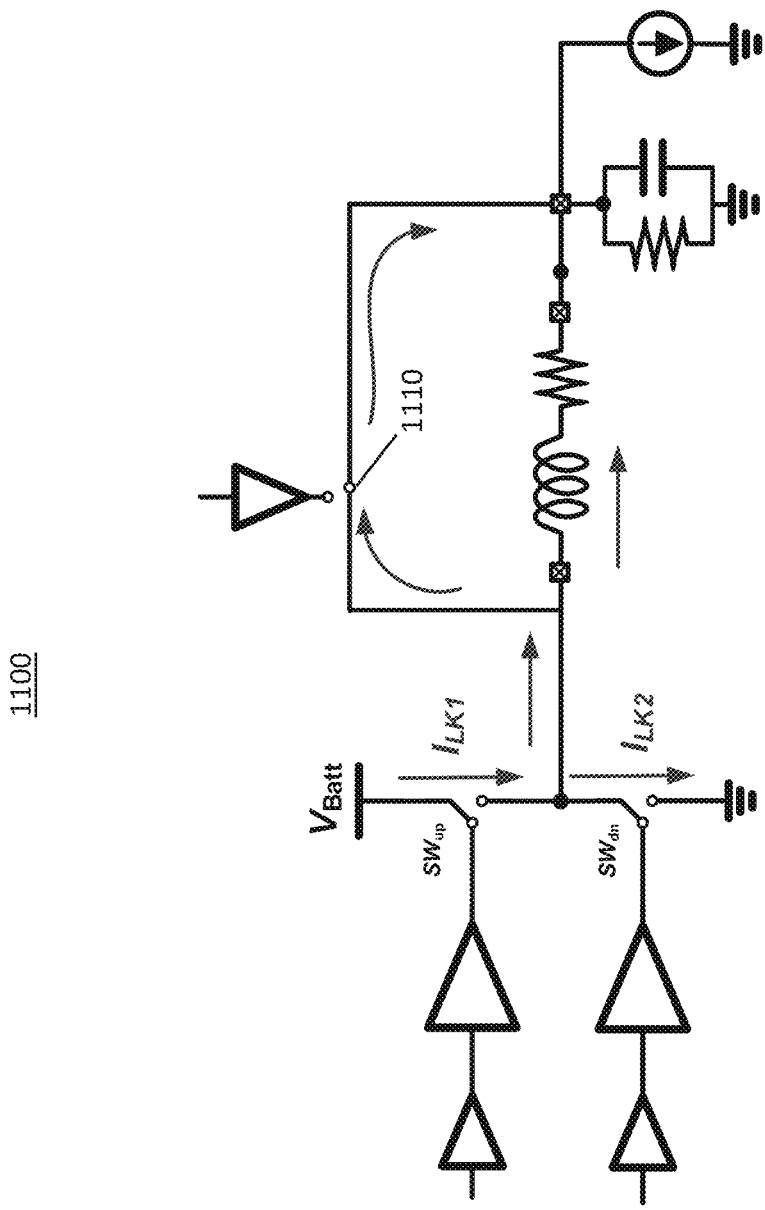
FIG. 11 depicts another example of an integrated power management system, in accordance with some example embodiments.

FIG. 11 depicts another example of an integrated power management system, in accordance with some example embodiments. The example shown in FIG. 11 includes components that are similar to the power management systems shown in FIGS. 1A, 1B and 2, except FIG. 11 shows a single switch 1110 across the inductor to zero the inductor rather than what was functionally done by the two switches 120 and 140 shown in FIG. 1A. A benefit of the topology shown in FIG. 11 is to use the leakage current (ILK1) to charge the output capacitor as opposed to letting it go to waste. This results in improved power efficiency at light load conditions.

Figure 12:
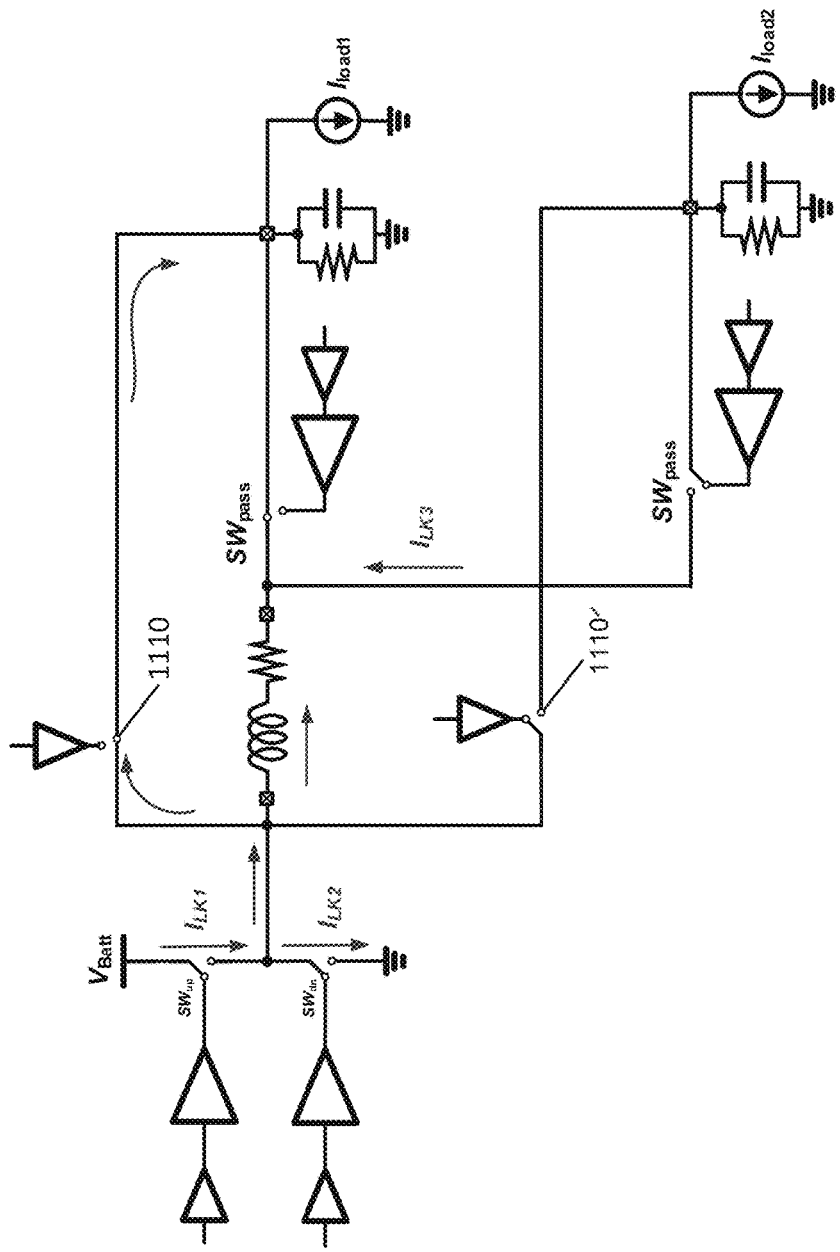
FIG. 12 depicts another example of an integrated power management system producing multiple outputs, in accordance with some example embodiments.

FIG. 12 depicts another example of an integrated power management system producing multiple outputs, in accordance with some example embodiments. The example shown in FIG. 12 includes components that are similar to the power management systems shown in FIG. 11 and FIG. 2. FIG. 12 produces multiple outputs similar to FIG. 2 but with a single switch 1110, 1110' for each domain directly across the inductor similar to FIG. 11. The purpose of SWpass switches is to allow multi-domain, single inductor operation for the circuit shown in FIG. 11. SWpass for each domain connects the domain of interest to the inductor when needed to serve that domain. The same switch keeps the domain of interest isolated from the rest of the circuit when needed. It should be noted that, for simplicity, some components have been omitted from FIGS. 11 and 12. It is understood, however, that similar to those in FIGS. 1A, 1B and 2, other components, such as those responsible for synchronizing and generating the timing information for operation of the switches can be added.

Certain aspects of the disclosed technology may be summarized by the following examples. In one example, the disclosed technology provides a method of regulating voltage by delivering a quantized portion of charge to a load only when required to maintain the load voltage level within a predetermined range. In one example, where two or more MOS transistors (either PMOS or NMOS) operate as switches and are connected between the common node and input voltage (Vin) and common mode node and ground, these switches are used to charge an inductor connected to the common node (when common node is connected to Vin) or discharge the same inductor (when common node is connected to ground. In another example method, the peak current in the inductor and the amount of charge delivered to the load is controlled by controlling the duration of time the switch between common node and Vin is ON. In yet another example, shunt and series switches are used on the load-side of the inductor to control the timing associated with charge delivery to the load. The series switch is ON during the charge and discharge time of the inductor. The shunt switch is ON when the inductor charge/energy is zero.

According to another example, at the beginning of inductor charging cycle, the switch between the inductor and Vin and the series switches are in the ON state to allow charge transfer from Vin to Load; furthermore, the switch configuration is altered after some time equal to the width of the inductor charging pulse to initiate inductor discharge process to avoid inductor peak current exceed a predetermined amount. In another example, the end of the inductor discharge phase is detected by zero current detection circuitry; the zero-current detection circuit, when triggered, opens the series switch and closes the shunt switch to ensure the entire charge taken from the battery is transferred to the load. The disclosed technology further enables regulating a voltage where the switching frequency can be easily programmed to allow spur-free frequency planning for RF applications. The switching frequency is monitored and altered as needed by using different one-shot pulse width to deliver charge packets to the load. A set of predetermined one-shot pulse widths can be programmed in a lookup table and used as needed to allow user defined frequency planning.

Figure 13:
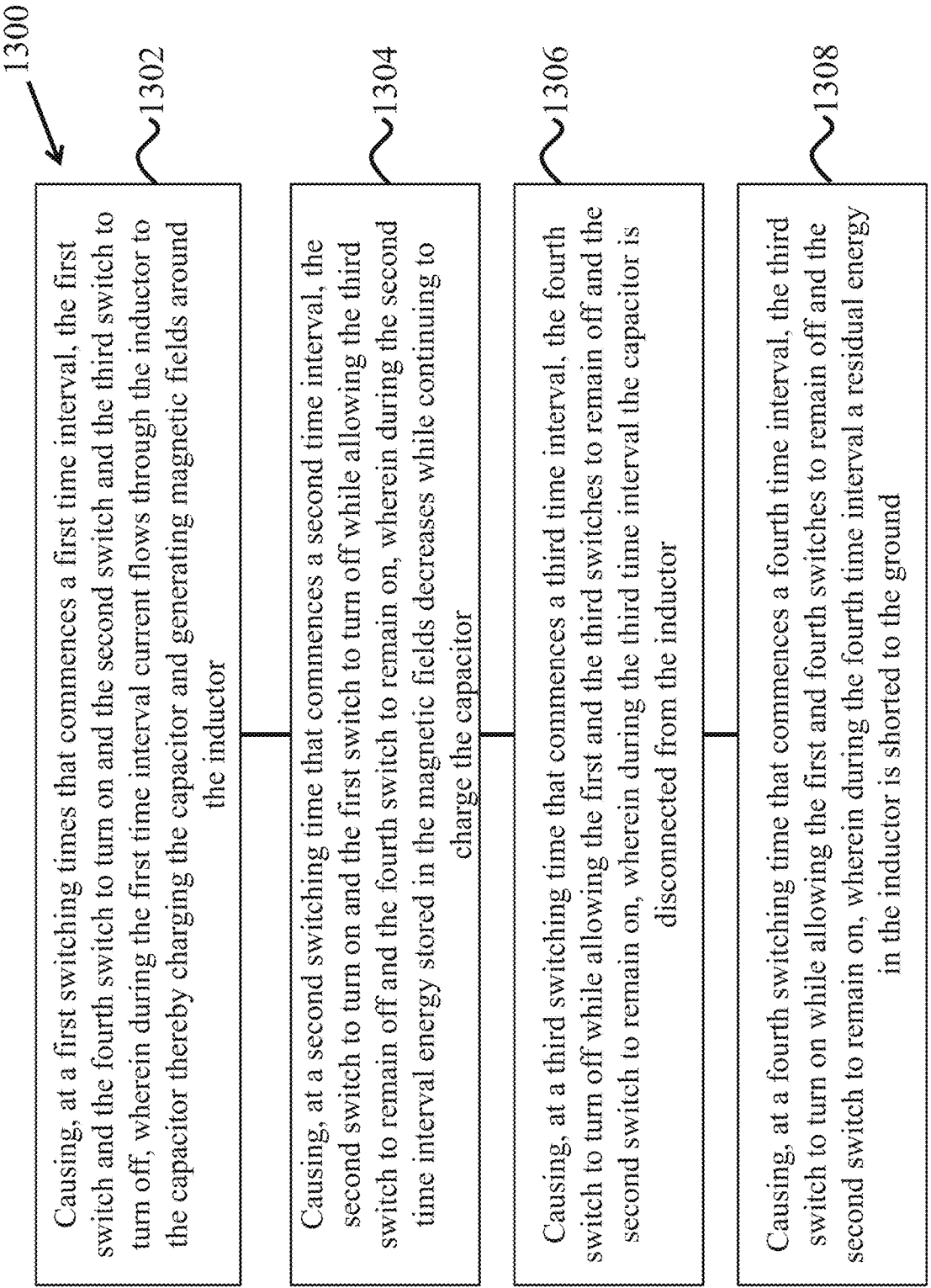
FIG. 13 depicts a set of example operations that can be carried out to effect power management, in accordance with some example embodiments.

FIG. 13 illustrates a set of operations that can be carried out for power conversion using a direct-current to direct-current (DC-DC) power converter according to some example embodiments. The DC-DC converter includes a first, a second, a third and a fourth switch. The first switch connects a first side of an inductor to a source voltage, the second switch connects the first side of the inductor and a ground, the third switch connects a second side of the inductor and the ground, and the fourth switch connects the second side of the inductor and a capacitor. The operations in FIG. 13 start at 1302 by causing, at a first switching times that commences a first time interval, the first switch and the fourth switch to turn on, and the second switch and the third switch to turn off. During the first time interval current flows through the inductor to the capacitor thereby charging the capacitor and generating magnetic fields around the inductor. The operations continue at 1304, by causing, at a second switching time that commences a second time interval, the second switch to turn on and the first switch to turn off, while allowing the third switch to remain off and the fourth switch to remain on. During the second time interval, energy stored in the magnetic fields decreases while continuing to charge the capacitor. The operations at 1306 includes causing, at a third switching time that commences a third time interval, the fourth switch to turn off, while allowing the first and the third switches to remain off and the second switch to remain on. During the third time interval, the capacitor is disconnected from the inductor. The operations at 1308 includes causing, at a fourth switching time that commences a fourth time interval, the third switch to turn on, while allowing the first and fourth switches to remain off and the second switch to remain on. During the fourth time interval both sides of the inductor are shorted to ground. The third and fourth switching intervals may or may not happen at the same time. The fourth time interval can also be used keep the energy in the inductor at or close to zero.

In one example embodiment, the first through the fourth switching times form a power cycle sequence, and the above noted operations further includes selecting a repetition rate of the power cycle sequence based on a required power at the output of the DC-DC converter such that a higher required power results in a higher repetition rate, and a lower required power results in a lower repetition rate. In another example embodiment, the above noted method includes selecting (or changing) a duration for the first switching interval to prevent the DC-DC power converter from producing conducted or radiated spurious emissions within a predetermined frequency band. In yet another example embodiment, the above operations include commencing a new power cycle sequence upon a determination that the output voltage is below a threshold voltage. In still another example embodiment, the above operations also include controlling a timing or a repetition of the power cycle sequence to: control a peak-to-peak size of a voltage ripple, or maximize power conversion efficiency of the DC-DC power converter.

One aspect of the disclosed embodiments relates to a DC-DC power converter that includes a first switch connected between a first side of an inductor and a first input that is configured to receive a first source voltage, a second switch connected between the first side of the inductor and a second input configured for connection to a ground, a third switch connected between a second side of the inductor and the second input, a fourth switch connected between the second side of the inductor and a capacitor, and a comparator coupled to the first, the second, the third and the fourth switches, and configured to compare an output voltage of the capacitor to a threshold voltage and activate or deactivate the first, the second, the third, and the fourth switches in a power cycle sequence based on the comparator output.

In one example embodiment, the power cycle sequence includes a first switching time, commencing a first time interval during which the first switch and the fourth switch are on and the second switch and the third switch are off, a second switching time, commencing a second time interval during which the second switch and the fourth switch are on and the first switch and the third switch are off, a third switching time, commencing a third time interval during which the second switch are on and the first switch, the third switch, and the fourth switch are off, and a fourth switching time, commencing a fourth time interval during which the second switch and the third switch are on and the first switch and the fourth switch are off. The third and fourth time intervals can occur simultaneously.

In one example embodiment, the capacitor is charged through the inductor during both the first and the second time intervals. In another example embodiment, the capacitor is disconnected from the inductor during the third time interval. In yet another example embodiment, an energy in the inductor is reduced and/or kept at zero (substantially zero) during the fourth time interval. According to another example embodiment, the DC-DC converter also includes a fifth switch configured to charge a second capacitor to a second output voltage during a time period different from the first, the second, the third, and the fourth time intervals. In another example embodiment, a repetition rate of the power cycle sequence is configured based on a required power at the output such that a higher required power results in a higher repetition rate, and a lower required power results in a lower repetition rate. In one example embodiment, a duration of the first time interval is selected to prevent the DC-DC power converter from producing conducted or radiated spurious emissions within a predetermined frequency band.

In one example embodiment, the comparator of the DC-DC converter is configured to commence the power cycle sequence upon a determination that the output voltage is below the threshold voltage. In another example embodiment, one or more of the first, the second, the third or the fourth switches include one or more of: a PMOS transistor, one or more multi-stack PMOS transistors, a combination of PMOS and NMOS transistors, all NMOS transistors including a monolithic or an off-chip flying capacitor, or a single or a multi-stack NMOS transistors. In another example embodiment, the DC-DC converter further includes a controller configured to control a timing and a repetition of the power cycle sequence to control a peak-to-peak size of a voltage ripple. In one example embodiment, the controller is configured to maintain the peak-to-peak size of a voltage ripple to within a predetermined range of voltage values. In another example embodiment, the controller is configured to autonomously select switching times of the first, the second, the third and the fourth switches to maximize power conversion efficiency of the DC-DC power converter. In still another example embodiment, the controller is configured to enable user programmable spurious tone elimination. In yet another example embodiment, the controller is configured to enable the DC-DC power converter to operate in one of a constant ripple or a constant frequency modes of operation. For example, the constant frequency mode of operation can include operation in selectively restricted frequency band. The controller may operate in synchronous, asynchronous or a combination of both.

According to another example embodiment, the fourth switch includes one or more of: an NMOS or a PMOS switch, a stacked NMOS or a PMOS switch, a transistor with or without a dynamically adjustable body bias, or a transistor with or without gate drive boost. In one example embodiment, the output of the DC-DC converter is configured to operate in a boost mode, a buck mode or a buck-boost mode.

Another aspect of the disclosed embodiments relates to a DC-DC power converter integrated circuit that includes a first switch, a second switch, a third switch, a fourth switch, and a comparator. The first switch is configured to connect or disconnect a source voltage input to or from a first side of an inductor, the second switch is configured to connect or disconnect the first side of the inductor to or from a ground input, the third switch is configured to connect or disconnect a second side of the inductor to or from the ground input, and the fourth switch is configured to connect or disconnect the second side of the inductor to or from a capacitor. Furthermore, the comparator is configured to receive and compare an output voltage of the capacitor to a threshold voltage, and to cause the first, the second, the third and the fourth switches to sequence in a power cycle based on a result of the comparison.

In one example embodiment, the above DC-DC converter also includes one or more additional switches, where each of the additional switches is configured to connect the second side of the inductor to a corresponding additional capacitor. Each additional capacitor produces an additional output of the DC-DC power converter integrated circuit, and the comparator is configured to receive and compare each of the additional outputs to a corresponding threshold voltage, and to cause the first, the second, the third, the fourth and at least one of the additional switches to selectively activate or deactivate based on results of the comparisons.

Another aspect of the disclosed embodiments relates to a system that includes any one of the above DC-DC power converters that are implemented as an integrated circuit and in which the inductor and the capacitor are implemented as discrete components that are external to the DC-DC power converter integrated circuit.

Another aspect of the disclosed embodiments relates to a direct-current to DC-DC power converter circuit that includes a first switch connected between an input configured to receive a source voltage and a first side of an inductor, a second switch connected between the first side of the inductor and another input configured for connection to a ground, a third switch connected between a second side of the inductor and the first side of the inductor, and a comparator configured to compare an output voltage of the capacitor to a threshold voltage, and to activate or deactivate the first, the second and the third switches in a power cycle sequence based on a comparator output. In one example embodiment, the power cycle sequence includes a first time instance at which the first switch to turn on and the second switch and the third switch to turn off, a second time instance at which the second switch to turn on and the first switch and the third switch to turn off, and a third time instance at which the third switch to turn on and the first switch and the second switch to turn off.

In one example embodiment, the above DC-DC converter also includes a fourth switch configured to charge a second capacitor to a second output voltage during a time period different from the first, second, and third time instances.

The subject matter described herein may be embodied in systems, apparatus, methods, and/or articles depending on the desired configuration. For example, at least a portion of the systems, apparatus, methods, and/or articles described herein can be implemented using one or more of the following: one or more semiconductor materials or substrates such as silicon, printed circuit board techniques, discrete electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language.

As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. In the context of this document, a "machine-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. It is understood that different embodiments or features may be combined with one another. In addition, the logic flow depicted in the accompanying figures and/or described herein does not require the particular order shown, or sequential order, to achieve desirable results. Other embodiments may be within the scope of the following claims.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

APPENDIX

This Appendix provides additional details and examples related to the disclosed power management systems and techniques. The controller scheme can be configured for either constant ripple or constant frequency. The low power control scheme can operate based on a fixed ripple approach. For a given target voltage ripple ($V_{APP-RIPPLE}$), the peak inductor current ($I_{IND-PEAK}$) and the inductor charging time ($T_{CHL}$) can be obtained from Equation (4) and Equation (1), respectively. The application capacitor charging time ($T_{CHC}$) can be obtained from Equation (2). Equation (3) shows the period associated with the control signal which is dictated by target application ripple and application current.

$$T_{CHL} = \frac{I_{IND-PEAK} \times L}{V_{IN} - V_{APP}},\qquad \text{Eq. (1).}$$

$$T_{CHC} = \frac{2 \times V_{APP-RIPPLE} \times C_{APP}}{(V_{IN} - V_{APP}) \times V_{APP}},\qquad \text{Eq. (2).}$$

$$T_R \approx \frac{C_{APP} \times V_{APP-RIPPLE}}{I_{APP}}\; I_{IND-PEAK} \gg I_{APP},\qquad \text{Eq. (3).}$$

$$I_{IND-PEAK} = \sqrt{\frac{2 \times V_{APP} \times (V_{IN} - V_{APP}) \times C_{APP} \times V_{APP-RIPPLE}}{L \times V_{IN}}},\qquad \text{Eq. (4).}$$

$$I_{IND-RMS} = I_{IND-PEAK} \times \sqrt{\frac{T_{CHC}}{3 \times T_R}},\qquad \text{Eq. (5).}$$

The fundamental switching frequency of the ULP IPR can be described by Equation (6):

$$F_{SW} = \frac{1}{\frac{I_{IND-PEAK} \times L \times V_{IN}}{V_{APP} \times (V_{IN} - V_{APP})} + \frac{C_{APP} \times V_{RIPPLE}}{I_{APP}}},\qquad \text{Eq. (6).}$$

The one-shot specification can be preprogrammed in a look-up table manner into the digital controller; for mode-based changes, the appropriate one-shot pulse specifications can be loaded to start. The one-shot pulse specifications can also be calculated inside the controller. The one-shot specifications may be adaptively modified if required based on the current information from the load to keep the switching frequency constrained. $I_{IND-PEAK}$ and $F_{SW}$ can be traded off for one another to either keep either peak inductor current or switching frequency restrained.

What is claimed is:

1. A direct-current to direct-current (DC-DC) power converter, comprising:
   a first switch connected between a first side of an inductor and a first input that is configured to receive a source voltage;
   a second switch connected between the first side of the inductor and a second input configured for connection to a ground;
   a third switch connected between a second side of the inductor and the second input;
   a fourth switch connected between the second side of the inductor and a capacitor; and
   a comparator coupled to the first, the second, the third and the fourth switches, and configured to compare an output voltage of the capacitor to a threshold voltage and activate or deactivate the first, the second, the third, and the fourth switches in a power cycle sequence based on the comparator output, wherein the power cycle sequence includes:
   a first switching time, commencing a first time interval during which the first switch and the fourth switch are on and the second switch and the third switch are off;
   a second switching time, commencing a second time interval during which the second switch and the fourth switch are on and the first switch and the third switch are off;
   a third switching time, commencing a third time interval during which the second switch is on and the first switch, the third switch, and the fourth switch are off; and
   a fourth switching time, commencing a fourth time interval during which the second switch and the third switch are on and the first switch and the fourth switch are off, wherein a duration of the first time interval is selected to eliminate conducted or radiated spurious emissions within a predetermined frequency band.

2. The DC-DC power converter of claim 1, wherein the capacitor is charged through the inductor during both the first and the second time intervals.

3. The DC-DC power converter of claim 1, the capacitor is disconnected from the inductor during the third time interval.

4. The DC-DC power converter of claim 1, wherein an energy in the inductor is reduced to or kept at zero during the fourth time interval.

5. The DC-DC power converter of claim 1, further comprising:
   a fifth switch configured to charge a second capacitor to a second output voltage during a time period different from the first, the second, the third, and the fourth time intervals.

6. The DC-DC power converter of claim 1, wherein a repetition rate of the power cycle sequence is configured based on a required power at the output such that a higher required power results in a higher repetition rate, and a lower required power results in a lower repetition rate.

7. The DC-DC power converter of claim 1, wherein the comparator is configured to commence the power cycle sequence upon a determination that the output voltage is below the threshold voltage.

8. The DC-DC power converter of claim 1, wherein one or more of the first, the second, the third or the fourth switches include one or more of:
   a PMOS transistor,
   one or more multi-stack PMOS transistors,
   a combination of PMOS and NMOS transistors,
   all NMOS transistors including a monolithic or an off-chip flying capacitor, or
   a single or a multi-stack NMOS transistors.

9. The DC-DC power converter of claim 1, further including a controller configured to control a timing and a repetition of the power cycle sequence to control a peak-to-peak size of a voltage ripple.

10. The DC-DC power converter of claim 9, wherein the controller is configured to maintain the peak-to-peak size of the voltage ripple to within a predetermined range of voltage values.

11. The DC-DC power converter of claim 9, wherein the controller is configured to select switching times of the first, the second, the third and the fourth switches based on entries in a lookup table that are precomputed to obtain a particular power conversion efficiency, voltage ripple or noise characteristic of the DC-DC power converter.

12. The DC-DC power converter of claim 9, wherein the controller is configured to enable user programmable spurious tone elimination.

13. The DC-DC power converter of claim 9, wherein the controller is configured to enable the DC-DC power converter to operate in one of a constant ripple or a selectively restricted frequency band modes of operation.

14. The DC-DC converter of claim 1, wherein the fourth switch includes one or more of:
   an NMOS or a PMOS switch,
   a stacked NMOS or a PMOS switch,
   a transistor with or without a dynamically adjustable body bias, or
   a transistor with or without gate drive boost.

15. The DC-DC converter of claim 1, wherein the DC-DC converter is configured to operate in a boost mode, a buck mode or a buck-boost mode.

16. A method of power conversion using a direct-current to direct-current (DC-DC) power converter comprising a first, a second, a third and a fourth switch, the first switch connecting a first side of an inductor to a source voltage, the second switch connecting the first side of the inductor and a ground, the third switch connecting a second side of the inductor and the ground, and the fourth switch connecting the second side of the inductor and a capacitor, the method comprising:

causing, at a first switching times that commences a first time interval, the first switch and the fourth switch to turn on and the second switch and the third switch to turn off, wherein during the first time interval current flows through the inductor to the capacitor thereby charging the capacitor and generating magnetic fields around the inductor;

causing, at a second switching time that commences a second time interval, the second switch to turn on and the first switch to turn off while allowing the third switch to remain off and the fourth switch to remain on, wherein during the second time interval energy stored in the magnetic fields decreases while continuing to charge the capacitor;

causing, at a third switching time that commences a third time interval, the fourth switch to turn off while allowing the first and the third switches to remain off and the second switch to remain on, wherein during the third time interval the capacitor is disconnected from the inductor; and causing, at a fourth switching time that commences a fourth time interval, the third switch to turn on while allowing the first and fourth switches to remain off and the second switch to remain on, wherein during the fourth time interval a residual energy in the inductor is shorted to the ground, wherein a duration of the first switching time is selected to eliminate conducted or radiated spurious emissions within a predetermined frequency band.

17. The method of claim 16, wherein the first through the fourth switching times form a power cycle sequence, and wherein the method further comprises selecting a repetition rate of the power cycle sequence based on a required power at the output of the DC-DC converter such that a higher required power results in a higher repetition rate, and a lower required power results in a lower repetition rate.

18. The method of claim 16, wherein the first through the fourth switching times form a power cycle sequence, and wherein the method further comprises commencing a new power cycle sequence upon a determination that the output voltage is below a threshold voltage.

19. The method of claim 16, further comprising controlling a timing or a repetition of the power cycle sequence to:
  control a peak-to-peak size of a voltage ripple, or
  maximize power conversion efficiency of the DC-DC power converter.

* * * * *